United States Patent
Zanotto et al.

(10) Patent No.: US 11,703,699 B2
(45) Date of Patent: Jul. 18, 2023

(54) OPTOMECHANICAL MODULATOR

(71) Applicant: Consiglio Nazionale delle Ricerche, Rome (IT)

(72) Inventors: Simone Zanotto, Pisa (IT); Alessandro Pitanti, Pisa (IT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 232 days.

(21) Appl. No.: 17/037,933

(22) Filed: Sep. 30, 2020

(65) Prior Publication Data
US 2021/0103163 A1    Apr. 8, 2021

Related U.S. Application Data

(60) Provisional application No. 62/909,663, filed on Oct. 2, 2019.

(51) Int. Cl.
*G02F 1/01* (2006.01)

(52) U.S. Cl.
CPC ................... *G02F 1/0128* (2013.01)

(58) Field of Classification Search
CPC .................................................... G02F 1/0128
USPC .......................................................... 359/290
See application file for complete search history.

(56) References Cited

U.S. PATENT DOCUMENTS

2015/0219806 A1   8/2015   Arbabi et al.

FOREIGN PATENT DOCUMENTS

| WO | 2015/128657 A1 | 9/2015 |
|---|---|---|
| WO | 2016164961 A1 | 10/2016 |

OTHER PUBLICATIONS

"Optomechanics of chiral dielectric metasurfaces", Simone Zanotto, Alessandro Tredicucci, Daniel Navarro-Urrios, Marco Cechini, Giorgio Baisiol, Davide Mencarelli, Luca Pierantoni, Alessadro Pitanti, Submitted Oct. 3, 2019, First Published Dec. 18, 2019, all pages relevant.
"Calculation of optical forces and polarization modulation in metasurface membranes by Hybrid RCWA scattering-transfer matrix method", Simone Zanotto, presentation at Workshop on Photonic Devices—Zuse Institut Berlin; Feb. 15, 2019. All Pages.
"Dynamical chiral metasurfaces: mechanical based modulation and polarimetry", Alessandro Pitanti, S. Zanotto, A. Tredicucci, G. Gaisiol, D. Navarro-Urrios; presentation of Alessandro Pitanti at META 2019; Jul. 23, 2019. All Pages.
Feeney, Orla, "Extended EP-Search Report (EESR): International Application No. EP 20199324.3", Feb. 18, 2021.
Zanotto Simone et al., "Chiral Metasurface Optomechanics", 2019 Conference on Lasers and Electro-Optics (CLEO), May 5, 2019, p. 1-2. Relevant Passages: p. 1-p. 2, Figures 1(a)-1(d).
Xinghui Yin et al., "Active Chiral Plasmonics", Nano Letters, Jun. 3, 2015, pp. 4255-4260, vol. 15, No. 7, US. Relevant Passages: p. 4256-4258, Figure 2.

*Primary Examiner* — William Choi
(74) *Attorney, Agent, or Firm* — Edwin A. Sisson, Attorney at Law, LLC; John W. Bain; Edwin A. Sisson

(57) ABSTRACT

This specification discusses a device which modulates, simultaneously or independently, the amplitude, polarization and phase of the electromagnetic radiation. This device has multiple metasurfaces, a spacer region between the metasurfaces, and an actuator for applying a force to at least one of the metasurfaces. The application of the force changes distance between at least two of the metasurfaces creating the of the electromagnetic radiation.

20 Claims, 27 Drawing Sheets

OPTOMECHANICAL MODULATOR

CROSS REFERENCES AND PRIORITIES

This application claims priority from U.S. Provisional Application No. 62/909,663 filed on 2 Oct. 2019, the teachings of which are incorporated in its entirety.

BACKGROUND

Electromagnetic fields coupled with mechanical degrees of freedom have recently shown exceptional and innovative applications, ultimately leading to mesoscopic optomechanical devices operating in the quantum regime of motion. Simultaneously, micromechanical elements have provided new ways to enhance and manipulate the optical properties of passive photonic elements.

Rapid technological advancements in micro- and nanofabrication have recently lead to a class of photonic resonators strongly intertwined with mechanical elements. This new field—Cavity Optomechanics—has lead the research efforts in photonic solid state devices showing exceptional properties, which ultimately resulted in the ground state cooling of motional modes in a mescoscopic system through radiation pressure. Not limited to this milestone result, a proper assessment of the mechanical motion in optomechanical systems can be used to strongly influence the output light, not only at a quantum level, producing squeezing and non-classical states, but even in a classic picture, with chaotic light and low-power, fast intensity modulation.

On the other hand, the field of photonic artificial materials has been a strong player in the field of electromagnetic structured media for more than two decades. Wavelength-scale patterns of scatterers have shown the capability to produce bright colors and extravagant surface effects, often mimicking what is elegantly realized in biological systems. In particular, nanostructuration techniques combined with powerful ab initio design tools allow to develop materials which show a chiral response far larger than their natural counterparts, i.e., stereochemical compounds.

Previous work has included a few GaAs based optomechanical devices have also been reported, yet none included chiral metasurfaces.

SUMMARY

This specification discloses how more functionalities can be added to an all dielectric chiral metasurface by defining its own pattern on a mechanically actuable GaAs membrane. The fundamental vibrational mode of the membrane produces a modulation of a complex combination of light intensity and/or polarization, as discussed in the detailed specification.

Conversely, the polarization state of the photons addressing the device and, particularly relevant, their chirality, can deeply influence the mechanical resonator by shifting its resonant frequency by a thermoelastic effect induced optical spring. The fast dynamical frequency, exceeding 300 kHz, makes this new kind of device appealing for possible future polarization modulators or fast polarimeters. Furthermore, while mechanics and temperature have somewhat been previously employed for statically reconfigurable metasurfaces, the system disclosed in this specification is believed to be the first to employ the mechanical motion for a dynamical control of the optomechanical device. Also, all prior art mechanically reconfigurable metasurface realizations are based on metallic scatterers, which offer degraded performances due to ohmic losses with respect to the all-dielectric system we report here.

This specification discloses an optomechanical modulator for modulating electromagnetic radiation of wavelength $\lambda$ comprising a plurality of metasurfaces, where for each metasurface n ($MS_{(n)}$), there is an outside reference plane n ($RP_{(n)}$) in an X-Y plane and an inside reference plane (n)' ($RP_{(n)'}$) which is parallel to the outside reference plane n ($RP_{(n)}$), with the inside reference plane (n)' ($RP_{(n)'}$) of metasurface n ($MS_{(n)}$) facing the outside reference plane (n+1) ($RP_{(n+1)}$) of metasurface (n+1) ($MS_{(n+1)}$), a spacer region n ($SP_{(n)}$) between the inside reference plane (n)' ($RP_{(n)'}$) of the metasurface n ($MS_{(n)}$) and the outside reference plane (n+1) ($RP_{(n+1)}$) of the metasurface n+1 $MS_{(n+1)}$; wherein each spacer region n ($SP_{(n)}$) has a static distance ($sd_{(n)}$) between the inside reference plane (n)' ($RP_{(n)'}$) and the outside reference plane n+1 ($RP_{(n+1)}$) of metasurface n+1 ($MS_{(n+1)}$) in a Z direction which is perpendicular to the X-Y plane; and n is an integer ranging from 1 to the total number of metasurfaces minus 1, and the total number of metasurfaces in the plurality of metasurfaces is in the range of 3 to 30 with the optomechanical modulator further comprising a mechanism to apply a force to at least one of the metasurfaces of the plurality of metasurfaces.

It is further disclosed that that the mechanism can move at least one of the metasurfaces of the plurality of metasurfaces and change the distance between a metasurface and an adjacent metasurface from the corresponding static distance between the metasurface and the adjacent metasurface.

The specification further discloses that the mechanism can be a piezoelectric actuator.

The specification also discloses that at least one of the metasurfaces is selected from the group consisting of spatial distributions of materials generating an electromagnetic inhomogeneity and at least one of the metasurfaces can comprise an inhomogeneity selected from the group consisting of one or more blocks and one or more holes drilled onto the at least one of the n metasurfaces, or combination of blocks and holes. It is also disclosed that the materials generating an electromagnetic inhomogeneity can be selected from the group consisting of one or more blocks or holes that are in a form selected from the group consisting of parallelepipeds, cylinders or combinations thereof.

The specification further discloses that at least one of the metasurfaces has a thickness which is greater than 0 and less than or equal to the wavelength $\lambda$.

It is disclosed that the total number of metasurfaces may be in the ranges of 3 to 25, 3 to 20, 3 to 15, 3 to 10, 3 to 6, 3 to 5, and 3 to 4.

It is further disclosed that the total number of metasurfaces may be in the ranges of 4 to 25, 4 to 20, 4 to 15, 4 to 10, 4 to 6, and 4 to 5.

A method to modulate the amplitude, phase and polarization of electromagnetic radiation having a wavelength $\lambda$ is also disclosed. The method impinges a beam of the electromagnetic radiation at the outside reference plane n=1 ($RP_1$) of metasurface n=1 ($MS_1$) of the device; and moves at least one of the metasurfaces of the plurality of metasurfaces and changing a distance between a metasurface and an adjacent metasurface from the corresponding static distance between the metasurface and the adjacent metasurface.

The movement may be provided by a force. This force may be provided by an actuator, i.e. a piezoelectric or electroactuator. The amount of voltage which might be applied to the actuator is in the range of 0.000001 Volt to 10 Volt.

The distance from which static distance has been changed may be in the range of 0.0005λ, to 1λ.

It is further disclosed that the distance from which the static distance has been changed modulates a polarization of the electromagnetic radiation along the main directions of a Poincaré sphere.

DETAILED DESCRIPTION

The following identifiers are used with in the Figures.
100 points the analytical setup used to measure the modulation of light.
200 points to the device, the optomechanical modulator.
210 points to a metasurface of the device.
220 points to the array of holes in the metasurface.
$I_0$ is the Incident light.
$I_R$ is the Reflected light.
$I_T$ is the Transmitted light.
$S_1$ denotes the first Stokes parameter.
$S_2$ denotes the second Stokes parameter.
$S_3$ denotes the third Stokes parameter.

The specification described in detail below discloses a method and device that experimentally demonstrates that the optical response of a chiral metasurface, sensitive to light polarization and in particular to light handedness, can be coupled to nanoscale mechanical motion. When this is done, fast linear and circular polarization modulation is realized; also, the mechanical resonant features are affected by the polarization, and in particular of chirality, of a drive light beam.

With the potential to be scaled up to high-frequency mechanical mode (~GHz) coherently excited by Surface Acoustic Waves, the disclosed method and device has the potential to strongly impact the field of polarization control. Furthermore, the polarization nonlinearity induced by the nontrivial mechanical interaction can pave the way to complex and fast operation on the polarization state of light, as polarization squeezing. Given the ubiquity of polarized light in fundamental science and in applications, the proof-of-principle experiments disclosed will open new avenues in several fields such as biophotonics, material science, drug discovery, and telecommunications.

One embodiment of the invented device, that comprises an optical chip containing a metasurface mounted on a piezoelectric actuator. A preferred embodiment is one with many metasurfaces, particularly more than 2 and preferably more than 3.

Figure 1A:
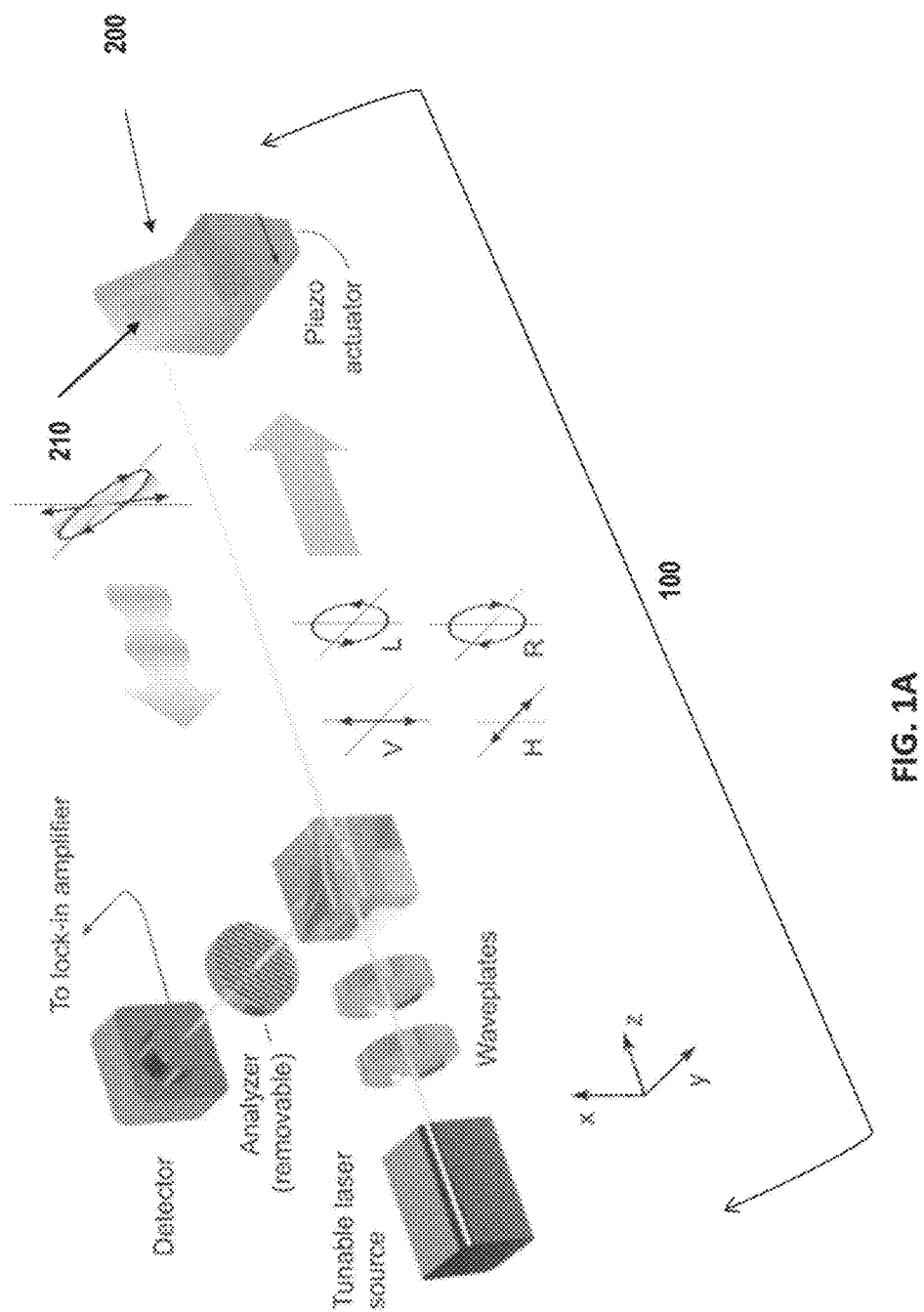
FIG. 1A is a sketch of the setup employed in the experiment and schematics of the effects observed.

FIGS. 1A to 1G depict the optomechanics of a multiple-metasurface device. In the present embodiment the device is capable of handling the light polarization and in particular its chiral properties. FIG. 1A is a sketch of the setup employed in the experiment and schematics of the effects observed in the experimental section (100). As can be seen, an arbitrarily polarized laser beam is reflected off the metasurface (210) of the device shown in FIG. 1B, with the light's intensity and polarization modulated in time. The device can be mounted in a vacuum chamber to enhance the mechanical resonance quality factor.

Figure 1B:
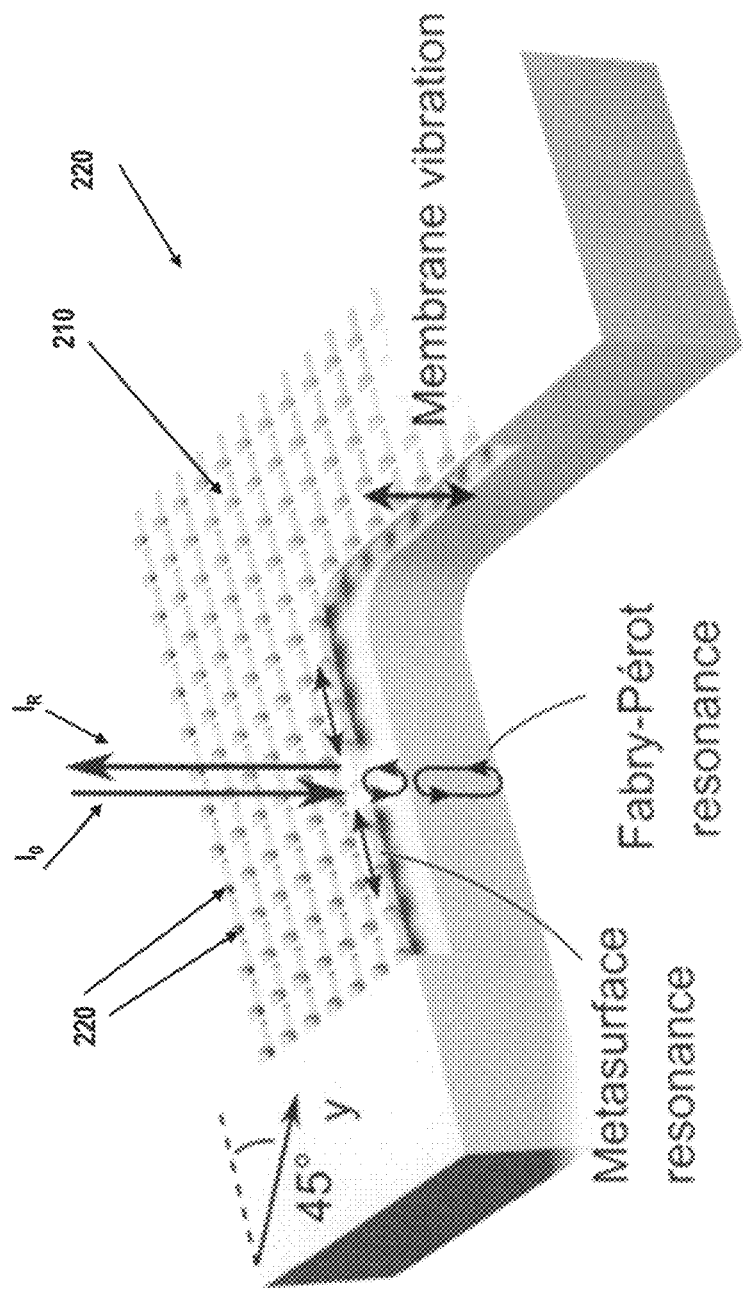
FIG. 1B is an embodiment of the device used in the experiments.

The device (200) is represented in FIG. 1B. As depicted in FIG. 1B, a semiconductor (GaAs) membrane is patterned with L-shaped holes (220), responsible for a chiral resonance arising from the combined metasurface effect and of the Fabry-Pérot effect. The photonic response is sensitive to the membrane vibration, as it affects the Fabry-Pérot length.

Figure 1C:
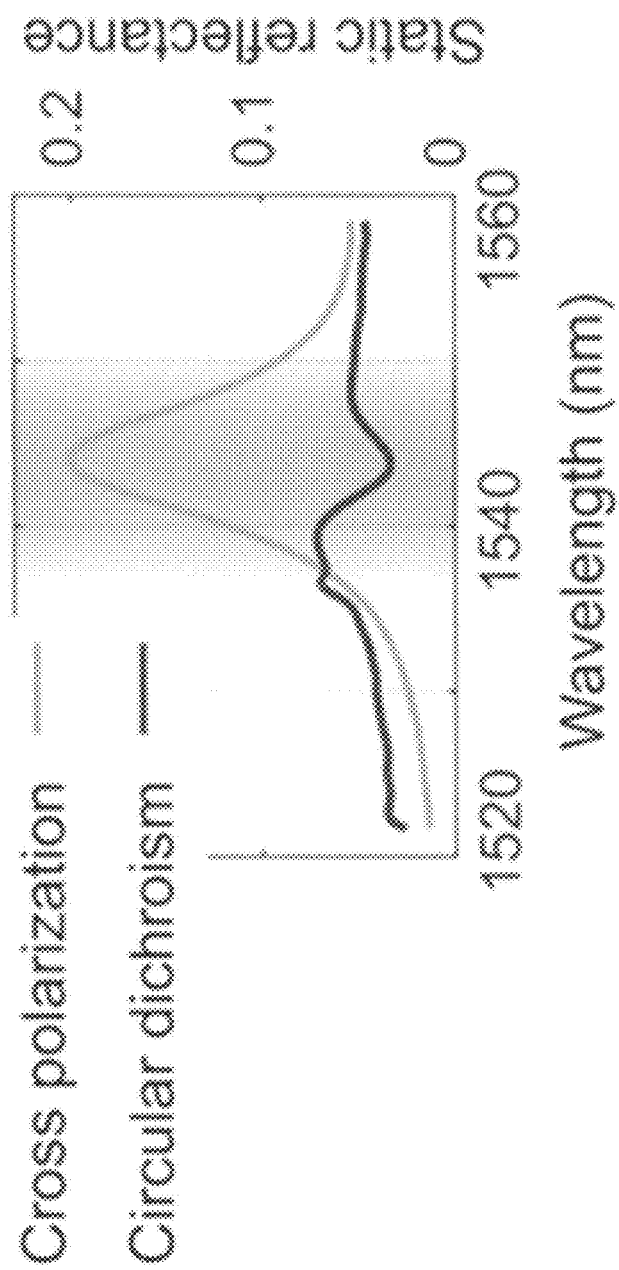
FIG. 1C is a plot showing where the polarization and chiral optical effects occur in the wavelength range relevant for telecommunications.

FIG. 1C is a plot showing where the polarization, and in particular the chiro-optical effects occur in the wavelength range relevant for telecommunications. As shown in FIG. 1C, the Fabry-Pérot effect is filtered out and the cross-polarized (H-polarized input, V-analyzed output) and circular dichroism (difference between reflection spectra with Right/Left circularly polarized inputs) curves are fingerprints of the metasurface resonance only. As evident from FIG. 1C, the cross polarization is the lighter shaded line that peaks at approximately 1545 nm and the circular dichroism is the darker line dipping at approximately 1545 nm.

Figure 1D:
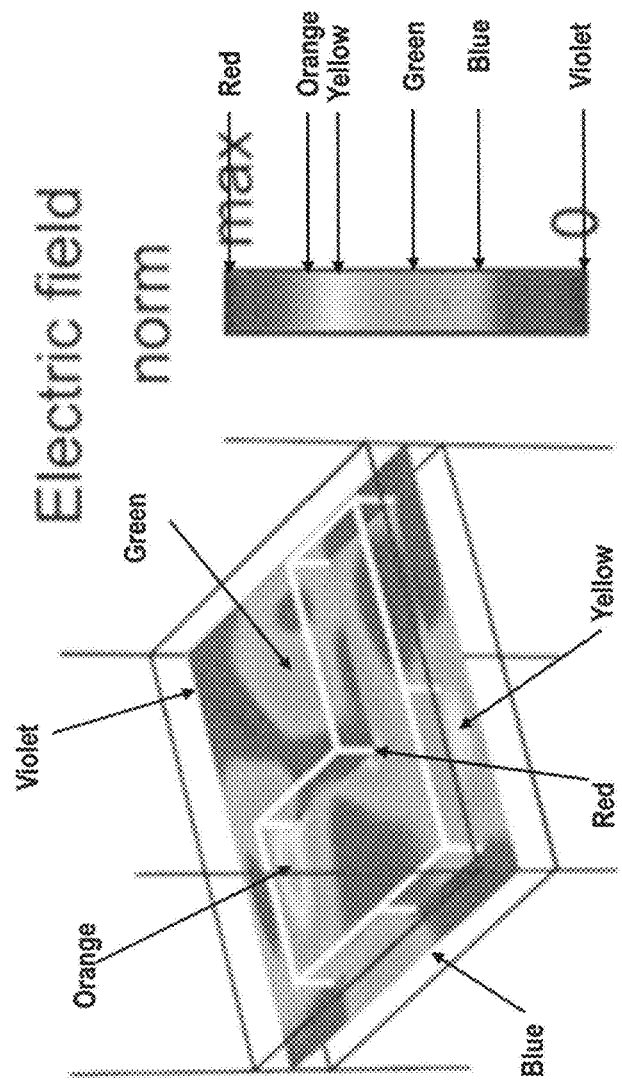
FIG. 1D is the plotted field profile of the mode responsible for such polarization and chiral effects.

FIG. 1D is the plotted field profile of the mode responsible for such polarization and chiral effects. The max corresponds to the color red, with the 0 corresponding with the color violet.

Figures 1E, 1F:
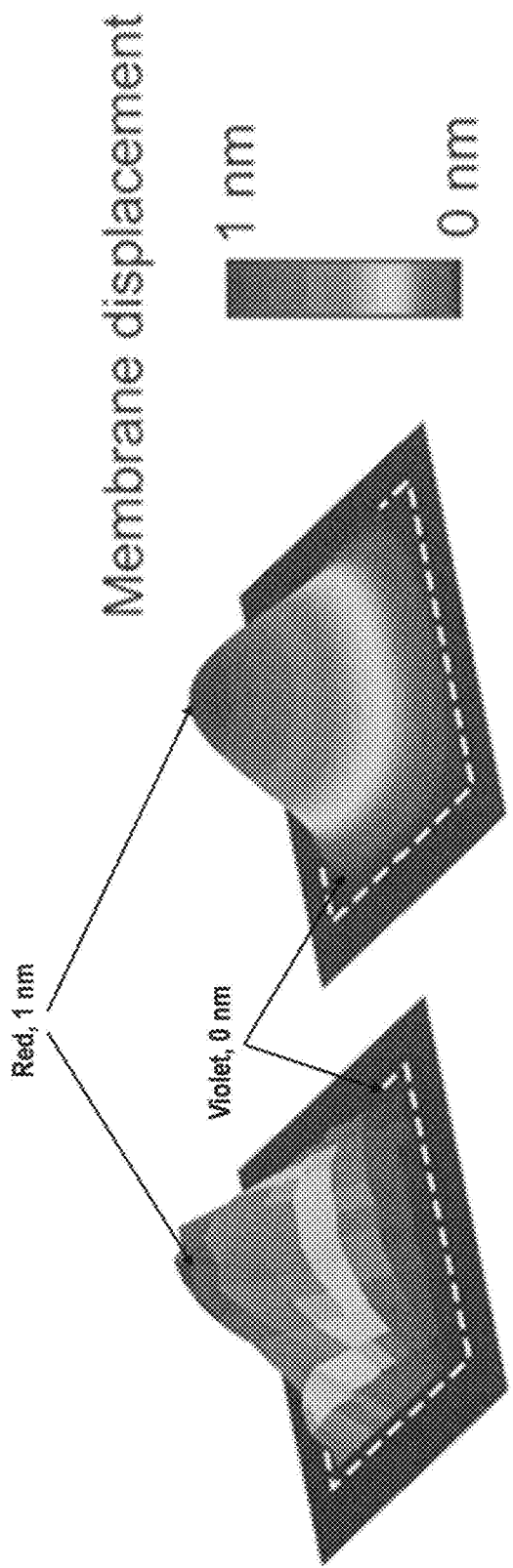
FIG. 1E is a panel illustrating the membrane displacement (measured by laser Doppler vibrometry). occurring when the fundamental mode is excited by a piezoelectric actuator in an experiment.
FIG. 1F is a panel illustrating the membrane displacement occurring when the fundamental mode is excited in a finite-element simulation.

FIG. 1E illustrates membrane displacement occurring when the fundamental mode is excited in an experiment (laser Doppler vibrometry). The 1 nm displacement is associated with RED and 0 displacement associated with VIOLET.

FIG. 1F is a panel illustrating the membrane displacement occurring when the fundamental mode is excited in a finite-element model. Again, the 1 nm displacement is associated with RED and 0 displacement associated with VIOLET.

Figure 1G:
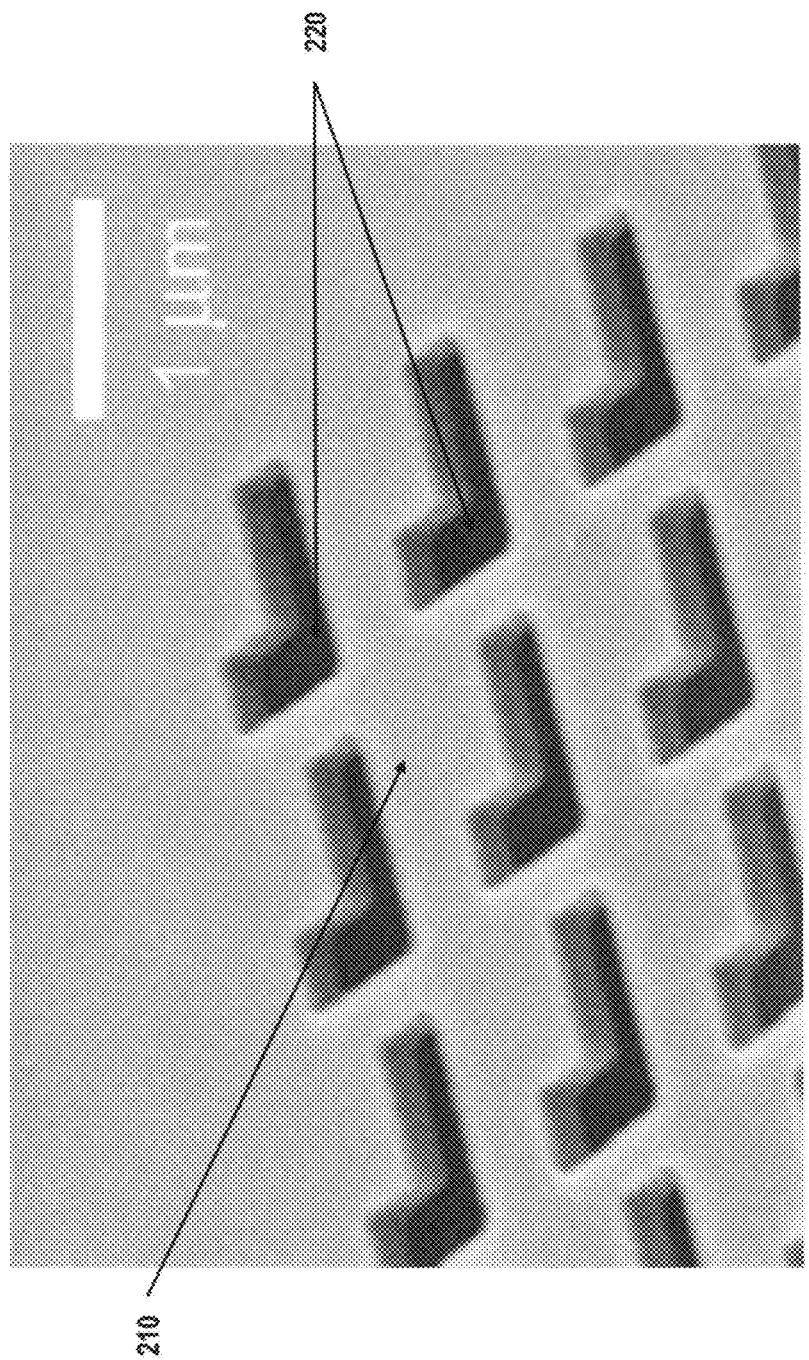
FIG. 1G is a scanning electron micrograph of the metasurface.

As shown in FIG. 1G, the fabrication of the device starts with patterning a periodic array of holes (220) on a 220 nm thick GaAs layer.

Gallium arsenide material has several advantages: it is easily machinable, it can host active elements, and it has strong nonlinear optical response. Moreover, being that its refractive index similar to that of silicon, the design presented in this specification can be straightforwardly exported to CMOS-compatible [Complementary Metal Oxide Semi-Conductor] platforms for further integrability with electronics.

As shown in the SEM micrograph of FIG. 1G, the metasurface pattern design of hole(s) (220) is a minimal one and it is "L-shaped". The "L-shape" is the simplest shape that breaks in-plane mirror symmetry, and it is the simplest shape that has 2D-chirality, and hence for chiro-optical polarization responses which can be relevant for some technological applications. Other shapes are contemplated as well (see below for a general definition of metasurface).

When the patterned membrane is considered in conjunction with the underneath substrate, the overall structure becomes truly 3D-chiral. The photonic response of the structure is thus a combination of two effects: the resonance of the sole patterned membrane and the multiple Fabry-Pérot resonances determined by membrane-substrate optical paths, as sketched in FIG. 1B. As depicted in FIG. 1B, a semiconductor (GaAs) membrane is patterned with L-shaped holes, responsible for a chiral resonance arising from the combined metasurface effect and of the Fabry-Pérot effect. The photonic response is sensitive to the membrane vibration, as it affects the Fabry-Pérot length.

Due to interference, the overall device optical response depends on the relative membrane to substrate distance; this gives a dissipative form of optomechanical coupling which are exploited in the experimental section.

The membrane vibration impacts on the phase, intensity and polarization of light and therefore can be investigated by looking at the device optical response. This is done using a standard free space setup where the polarization state of input light can be easily controlled, as shown in FIG. 1A.

The membrane oscillations are mechanically forced. In most of the experiments in this specification, the membrane oscillations are forced by a piezoelectric actuator, and the coherent response is detected through a lock-in amplifier.

The mechanical mode used was the fundamental one, which was independently characterized using a Laser Doppler Vibrometer (See FIG. 1E).

The simulated mode (predicted at 0.34 MHz according to full 3D Finite Element Methods (FEM) simulations, (See FIG. 1F) well reproduce the displacement field evaluated in the interferometric measurement.

Experimental and Discussion of Results

The mechanical effect on the optical response of the device can be easily described by means of reflection matrices, which describe the amplitude, phase and polarization response of the metasurface-substrate complex.

The reflection matrix R connects the incident and the reflected wave field components by, $E^-=R\,E^+$ being $E^+=(E^+_x, E^+_y)$ and $E^-=(E^-_x, E^-_y)$ which are the Cartesian components of the complex electric field vector associated to with the incident wave (sign plus +) and reflected wave (sign minus −). In addition to the fixed metasurface geometric parameters, the R matrix depends on the distance between the membrane and the substrate, identified by d in FIG. 2A. When the membrane moves, the R matrix depends on the deviation of its distance from the static distance denoted as sd. This deviation is identified by $\zeta$ and is a function of time (t). It can be assumed that a focused laser beam, smaller than the membrane size, locally probes rigid membrane shifts, leading to approximating $\zeta$ as a number that depends only on the time, and independent on the position across the membrane. For small oscillation amplitudes, the formula can be written as:

$$R(\zeta)=R^{(0)}+R^{(1)}\zeta$$

where $R^{(1)}=\partial R/\partial \zeta$ and $\zeta$ is the displacement from the static distance. From this, static and dynamic response of the metasurface can be easily determined. It should be noted that in FIG. 2A, the substrate surface is also a metasurface.

Static response follows from reflection coefficients encoded in $R^{(0)}$. As an example, experimental cross-polarized (Horizontally-polarized input, Vertically-analyzed output) and circular dichroism (difference between output intensities for right-circular and left-circular inputs) reflection spectra are reported in FIG. 1C, where the Fabry-Pérot fringes have been artificially removed for the sake of clarity. This formalism well reproduces the measured spectra which mainly consist of a broad resonant feature centered at about 1545 nm. The simulated field profile of the corresponding optical mode is reported in FIG. 1D. Were FIG. 1D in color, the Max would be Red and the Min would be Violet, with the colors in between following the order of Red, Orange, Yellow, Green, Blue, Indigo, and Violet. Were FIGS. 1E and 1F in color, the Max would be Red and the Min would be Violet, with the colors in between following the order of Red, Light Blue, Blue, and Violet.

Dynamical response consists in a modulation of phase, amplitude and polarization state of the reflected wave ($R^{(1)}$) around the point dictated by static response ($R^{(0)}$). Particular forms of static and dynamic reflectivities can be targeted at the design stage; in particular, it has been demonstrated in the prior art that using an appropriately complex metasurface unit cell, arbitrary control on the reflectivities can be achieved. On the other hand, the invented device employs a minimal design, resulting from the maximization of circular dichroism at 1545 nm. Despite its simplicity, it offers a rich landscape of static responses in its spectrum of operation (i.e. both positive and negative circular and linear dichroisms) and perfectly illustrates the physics behind static and dynamic control of polarization states.

This is shown by performing a modulation experiment where the incident polarization is kept fixed to the horizontal (H) state (FIG. 2A), and the intensity modulation of the reflected wave is detected. FIGS. 2A to 2D depict optomechanical fingerprints on linear polarization.

Figure 2A:
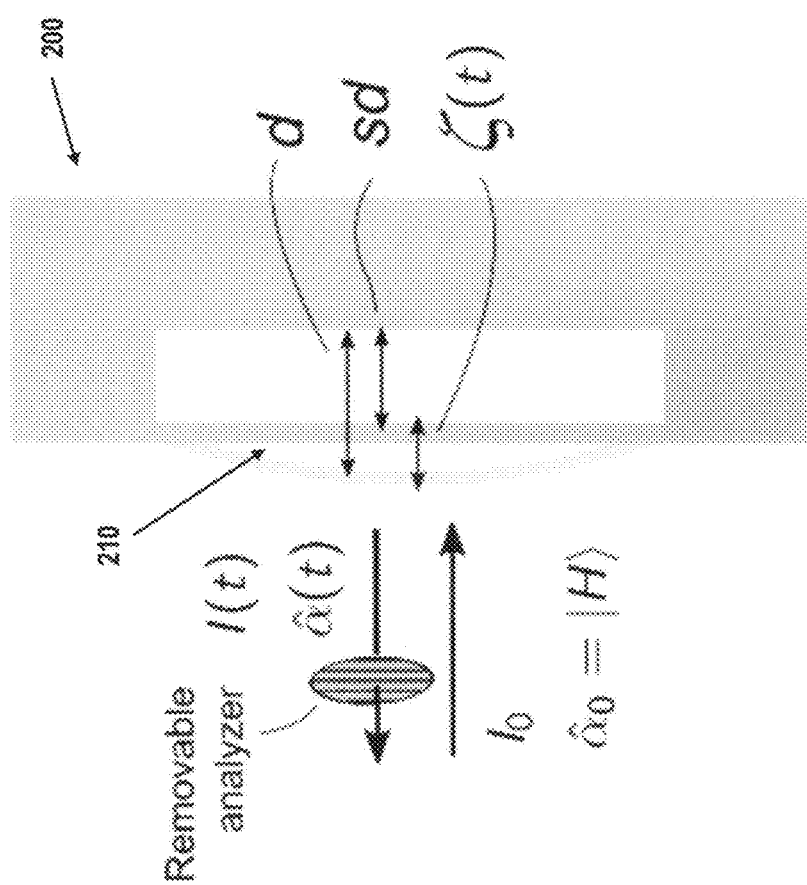
FIG. 2A is a schematic of the experiment.
Figure 2B:
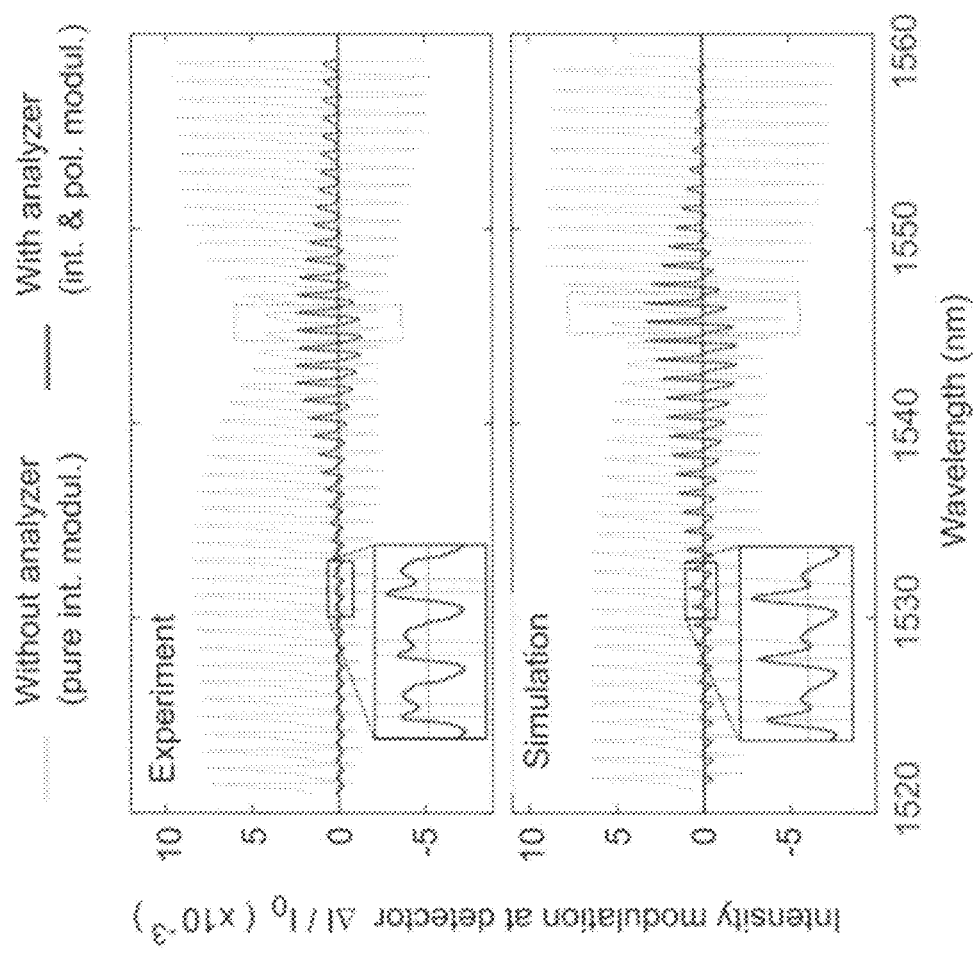
FIG. 2B demonstrates the modulation of the intensity and polarization as the membrane oscillates in time (0.8 nm oscillation amplitude).
Figure 2C:
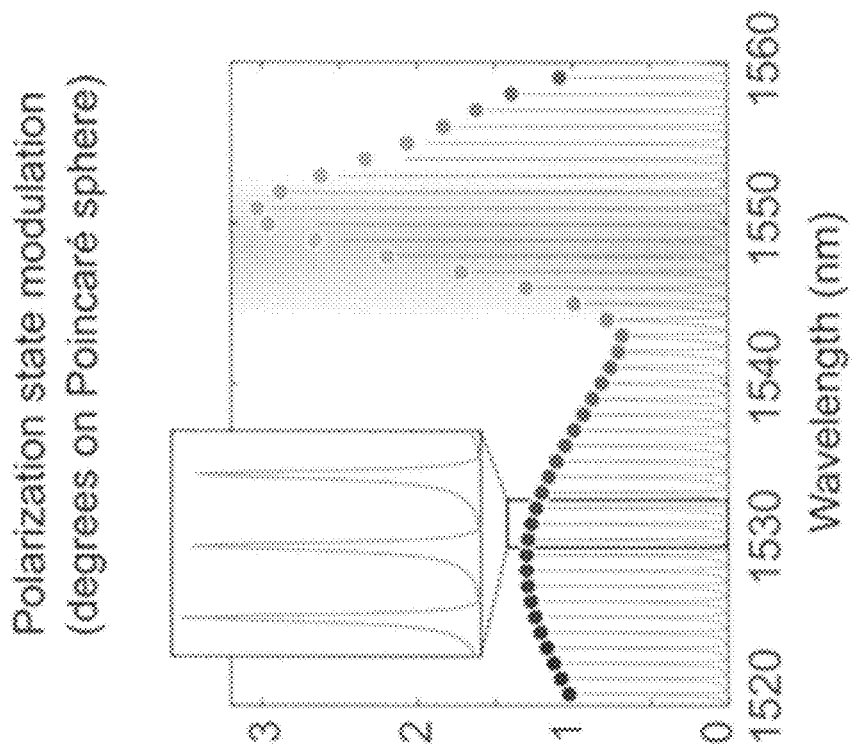
FIG. 2C is the calculated polarization modulation spectrum for 3 nm oscillation amplitude.

FIG. 2A is a schematic of the experiment. Linearly horizontally polarized light (see also FIG. 1 for the convention) is incident with a constant intensity on the metasurface. The grey area being the device and showing the movement of the membrane with:

$I_0$ being the incident electromagnetic radiation.

$I(t)$ being the reflected electromagnetic radiation as a function of time (t).

$\alpha_0$ being the polarization of incident electromagnetic radiation.

$\alpha(t)$ being the polarization of reflected electromagnetic radiation as a function of time (t).

$\zeta(t)$ being the distance (or displacement) that the metasurface has moved from the static distance, defined below, as a function of time (t) and is the maximum distance from the static distance (sd) at time (t).

sd is the static distance from one metasurface to the adjacent metasurface.

d is the distance from the other metasurface.

At t=0 there is no force upon the device, and therefore (t)=0. At this point there is a distance between the two surfaces which is called the static distance (sd). This static distance (sd) can be in the range 0 to 500 times $\lambda$, which is the wavelength of the incident electromagnetic radiation. Other preferred ranges are 0.05 to 500 times $\lambda$, 0 to 1 times $\lambda$, 0.05 to 1 times $\lambda$, and 200 to 300 times $\lambda$, as evidenced in the embodiment.

To fully illustrate the metasurface dynamical response, two measurements were made with and without a linear polarizer placed in the reflected beam with vertical (V) pass axis, respectively. The results are reported in FIG. 2B, together with the simulations for comparison. The traces show the wavelength-dependent intensity modulation observed at the detector, i.e., after the sample and a possible linear analyzer. Light blue traces are obtained without the analyzer, hence quantifying the pure intensity modulation (pure int. modul). Dark blue traces are obtained with the analyzer, thus being contributed from intensity and polarization modulation (int. & pol. modul). The wavelength range highlighted in the gray box is the object of further analysis (see FIG. Set 4). The fast wavelength oscillations are due to Fabry-Pérot effect in the substrate.

Note that the modulation spectrum shows evident fringes, dictated by multiple Fabry-Pérot resonances; superimposed to it a weak envelope centered around the metasurface resonance can be observed. The measurement without the analyzer indicates that the metasurface oscillation is capable of inducing a pure intensity modulation by acting on the modulus of the reflected field $|E^-|^2$; by comparing this spectrum with that obtained with the analyzer an interesting feature appears: the cross-polarized spectrum (darker curve) shows a completely different wavelength dependence, evidencing a dynamic polarization state modulation. If the polarization state were only rotated in a static way, the cross-polarized modulation spectrum would be simply a fraction of the spectrum taken without analyzer; as this is not the case, it means that the polarization state itself is modified by the mechanical motion.

Further theoretical analysis was conducted in the direction of full dynamic polarimetry of the reflected light. Having access to matrices $R_{(0)}$ and $R_{(1)}$ it is straightforward to determine the normalized Stokes parameters of the reflected radiation and its dependence on the displacement $\zeta$. A natural metric to quantify the polarization modulation effect is to measure the arc distance between two points on the Poincaré sphere calculated for $\zeta=0$ and $\zeta=0.8$ nm (i.e., the membrane displacement measured in the experiment discussed above). Displacement is the change in location of the membrane from its location at its static distance. The arc distance, stated in terms of the angle subtended between the two polarization points and the sphere center, is plotted with its spectral dependence in FIG. 2C which, as shown in the text, plots the wavelength vs. the degrees on the Poincaré sphere, where the peak maxima are highlighted with circular markers. Both the strong Fabry-Pérot oscillations and the envelope effect of the metasurface resonance are still evident. A maximum polarization state modulation of roughly 0.02 rad/nm can be appreciated. By increasing the piezoelectric actuator driving voltage, the harmonic modulation value can be linearly increased up to about 0.2 rad (when the device operates in vacuum). The system's main limitation occurs when the mechanical motion becomes nonlinear, giving rise to an anharmonic time dependence, which in any case can still produce modulation amplitude exceeding 0.5 rad.

Figure 2D:
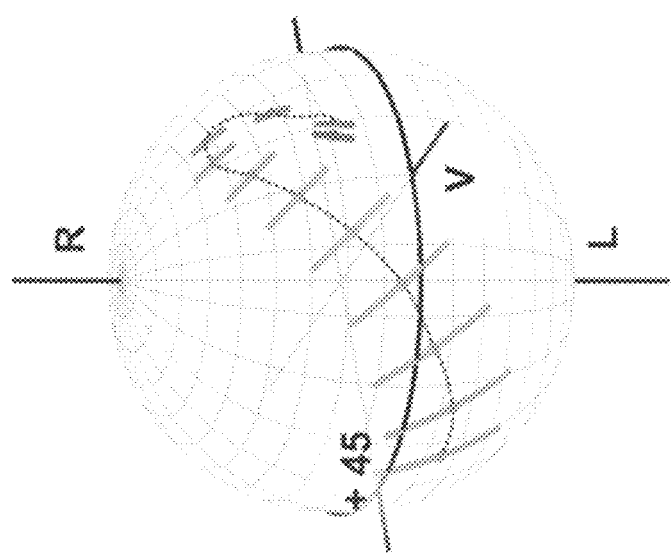
FIG. 2D depicts the polarization rotation and modulation represented as normalized Stokes parameters on the Poincaré sphere around the metasurface resonance.

More insights are gained by looking at the actual location of the polarization state on the Poincaré sphere and at the path followed by the normalized polarization point on the sphere when mechanical oscillation occurs. These important features are illustrated in FIG. 2D which shows the analysis of a selection of wavelengths close to the metasurface resonance (peaks of FIG. 2C in the gray shaded area). Each colored (varying grey) segment corresponds to the wavelength of a peak of the curve in FIG. 2D, in the gray-shaded region lying from 1545 nm to 1547 nm). The center of each segment is the steady-state output polarization, still for H-polarized input. Oscillation amplitude is here assumed to be 3 nm. The colored segments on the sphere represent the polarization modulation occurring when is tuned from −3 to +3 nm. Such a larger displacement is still experimentally accessible, as discussed, at the expense of losing perfect mechanical linearity. When the modulation is mapped on the Poincaré sphere (FIG. 2D) it illustrates a very interesting behavior: in the metasurface resonance region, both static polarization state and polarization modulation "direction" can be chosen in a non-trivial way. Here, the wavelength is the tuning parameter; more generally, static and dynamic polarization response can be chosen by appropriately targeting wavelength and geometric parameters. It can be envisaged that more complex structures, which go beyond the proof-of-principle L-shaped array analyzed here, could lead to designer's targeted polarization and wavelength response.

Linear polarization rotation is a precursor of chirality, in the sense that chiral objects generally rotate the polarization plane of a linearly polarized beam. However, a more direct measure of electromagnetic chirality is circular dichroism (CD). We hence measure the optomechanical effect on circular dichroism by measuring its modulation induced by membrane oscillation.

Figure 3:
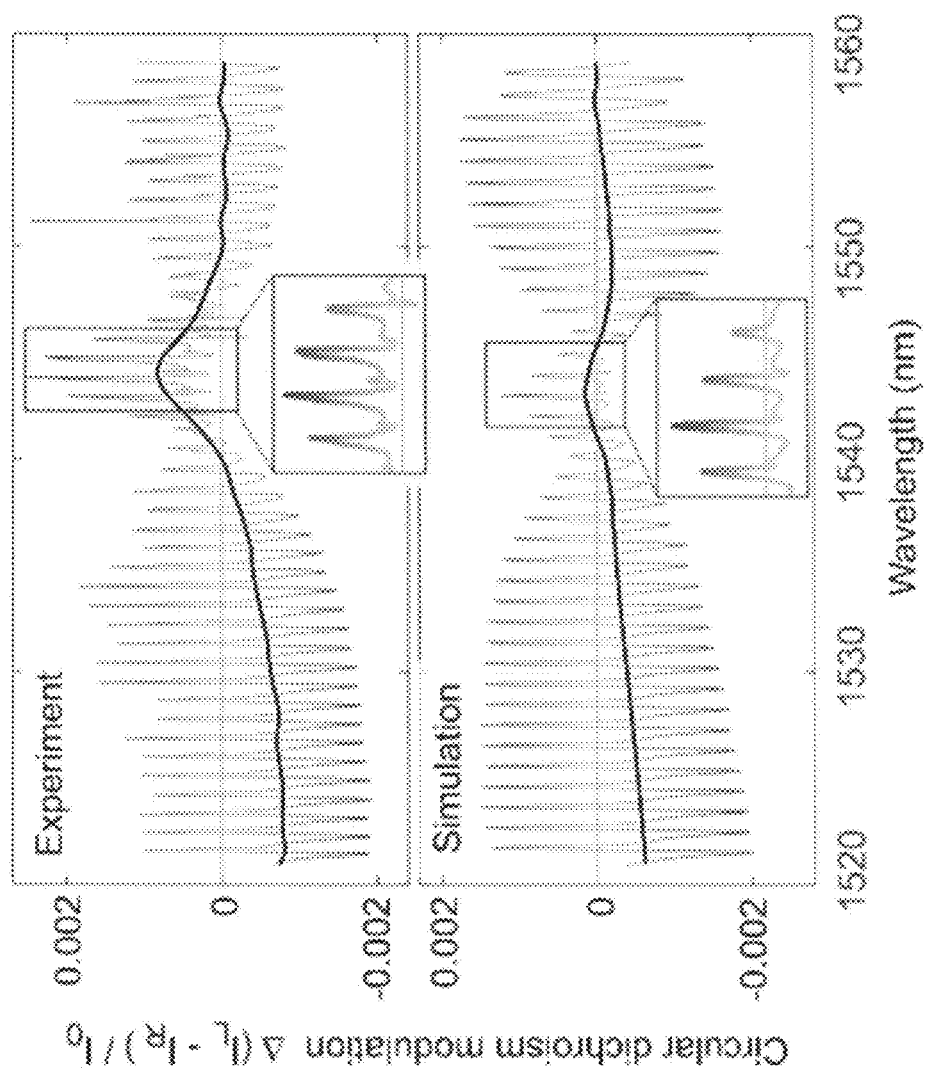
FIG. 3 depicts the optomechanical fingerprints on circular polarization.

The result is illustrated in FIG. 3: the spectral behavior displays clear fingerprints well reproduced by the full wave electromagnetic simulation, even in their finer details. As evident, circular dichroism modulation is occurring upon mechanical oscillation of the membrane. Narrow wavelength features are due to Fabry-Pérot interference occurring in the substrate, while the envelope shape is dictated by the metasurface resonance. These data evidence two main points. First, the device is a wavelength-sensitive modulator acting on circular polarization, which can replace other technologies like liquid crystal based modulators. The advantage lies in the possibility to avoid any encapsulation technique needed to confine the liquid phase, which hinders miniaturization and integration of the components; moreover, the actuation frequency of our device is larger than that typically achieved in liquid crystal devices (hundreds of kHz versus tens of kHz). Also, despite the narrow operation bandwidth of our prototype, improved designs can be realized to target specific operation wavelengths and modulation frequencies. Second, mechanical oscillations act on the proper, near-field based electromagnetic chirality of the metasurface, eventually connected to the capability that local fields have to excite chiral molecules. Since this mechanism can be employed to discriminate between the helicity of analytes, our chirality tuning method may be employed in sensing platforms where the local electromagnetic chirality is required to be modulated at a high frequency.

The following discussion relies upon FIGS. 4A to 4F which depict the optomechanical spring effect in the high mechanical Q-factor regime. The phenomena analyzed so far have been studied in ambient conditions. While this demonstrates the robustness of the sample, the presence of air at atmospheric pressure degrades the mechanical quality factor, preventing from a full exploitation of the potentials of the optomechanical interaction. To this end we enclosed the sample in a vacuum chamber and analyzed again the mechanical response. By reducing the air-induced damping, at a pressure of 3e-5 mbar, the mechanical features can be well fitted with Lorentzian line shapes (see the quadrature-space fits of FIG. 4B) holding linewidths as narrow as 0.15 kHz, translating in Q-factors of about 2000.

At first, we focused on the light response over a linearly, H-polarized input. The detected signal is reported in FIG. 4A, as a function of laser optical wavelength (λ) and mechanical driving frequency. In the analyzed range, which spans slightly more than one Fabry-Pérot fringe, different levels of modulation amplitude are accompanied by a redshift in the mechanical resonant frequency. In this case input polarization is H and no analyzer is present.

Figure 4A:
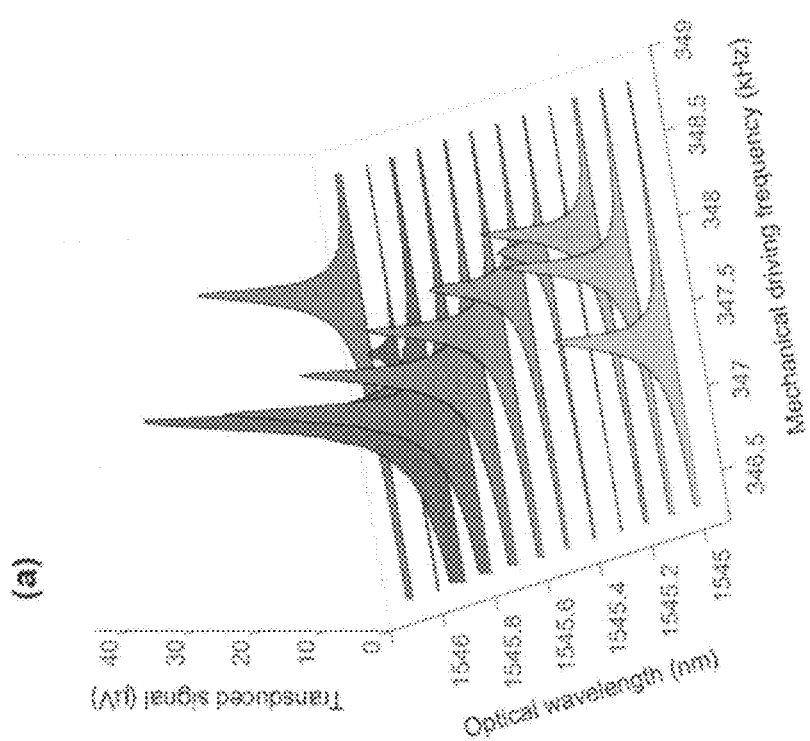
FIG. 4A depicts the evolution of the mechanical resonance, with the sample being in vacuum, for light wavelength swept around one Fabry-Pérot fringe, with both peak value and mechanical central frequency dependent on the light wavelength.
Figure 4B:
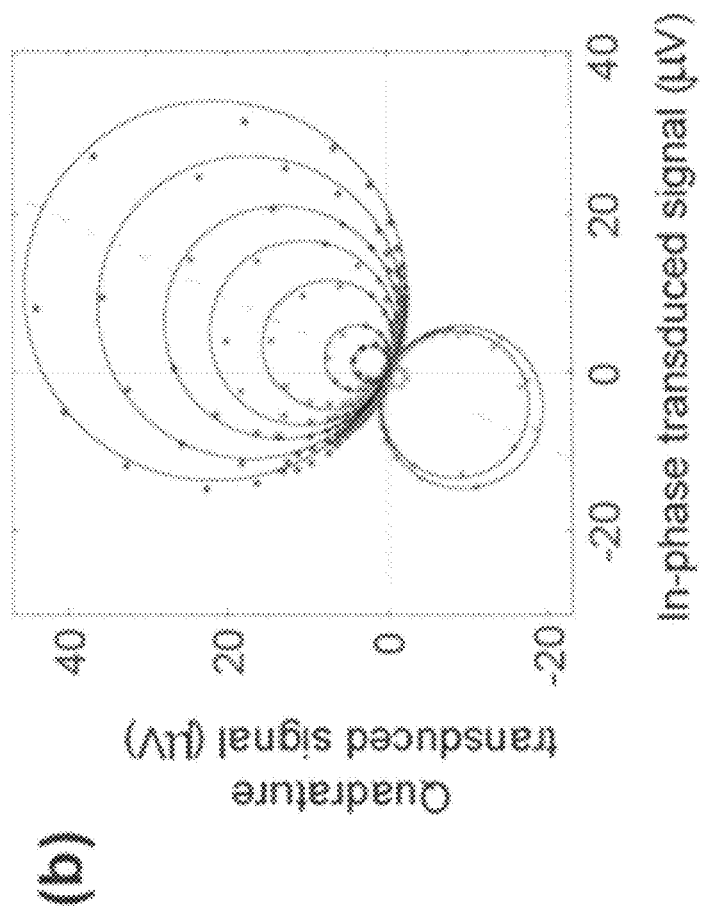
FIG. 4B depicts the fit of the transduced signal in the quadrature space.
Figure 4C:
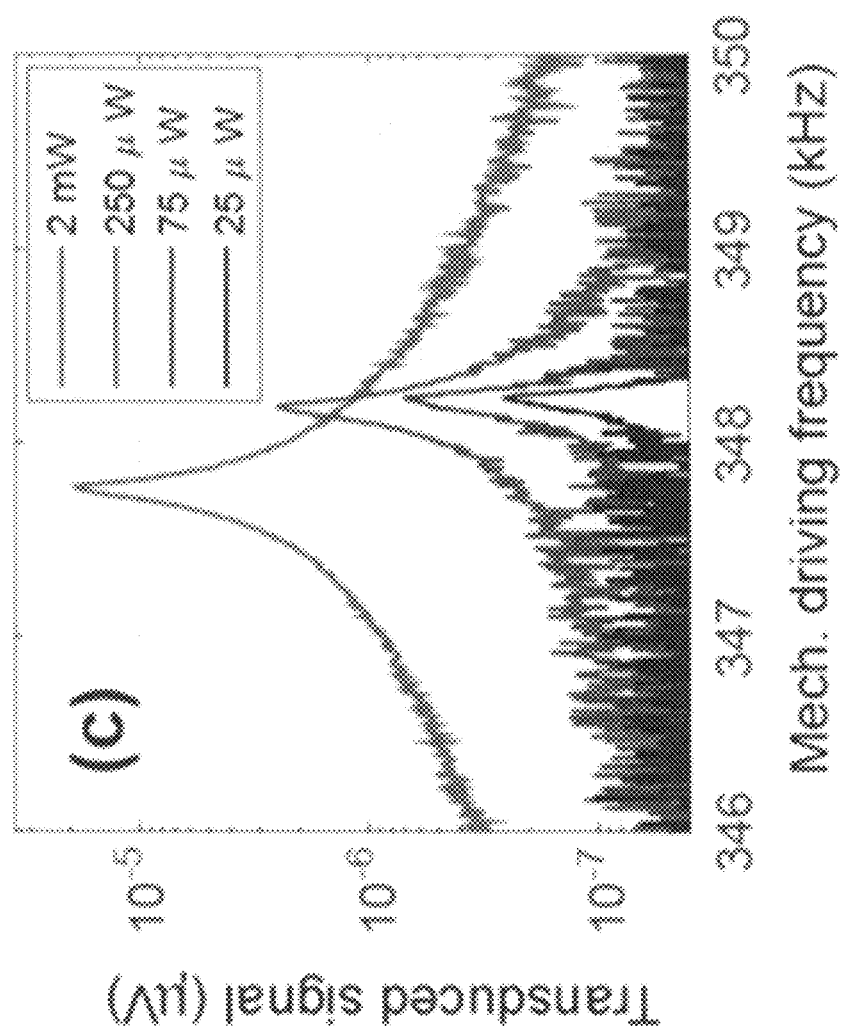
FIG. 4C depicts the dependence of the transduced mechanical spectrum upon optical power.
Figure 4D:
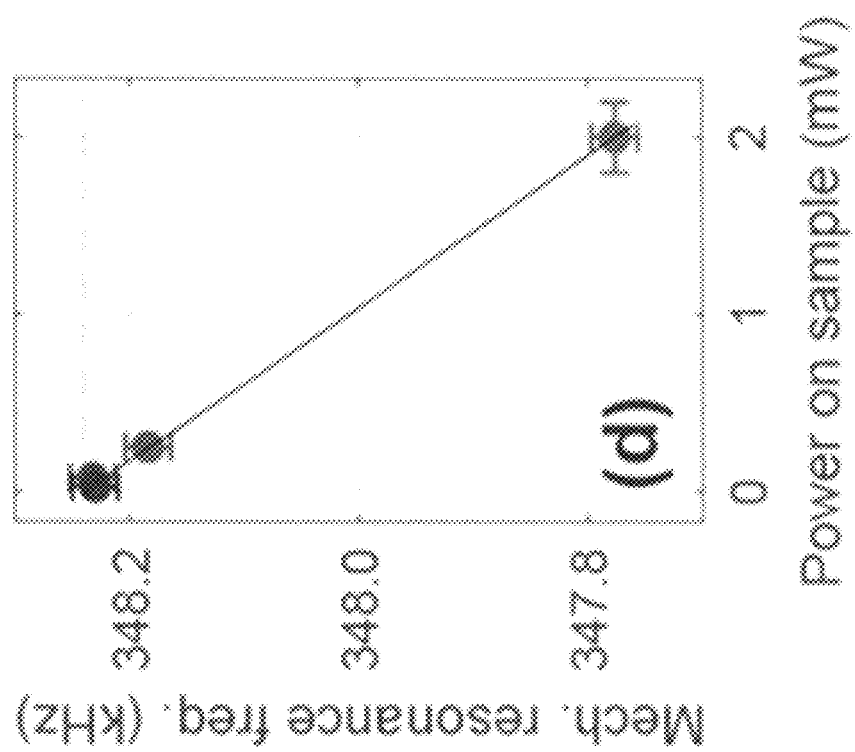
FIG. 4D demonstrates the resonance red-shift with optical power.
Figures 4E, 4F:
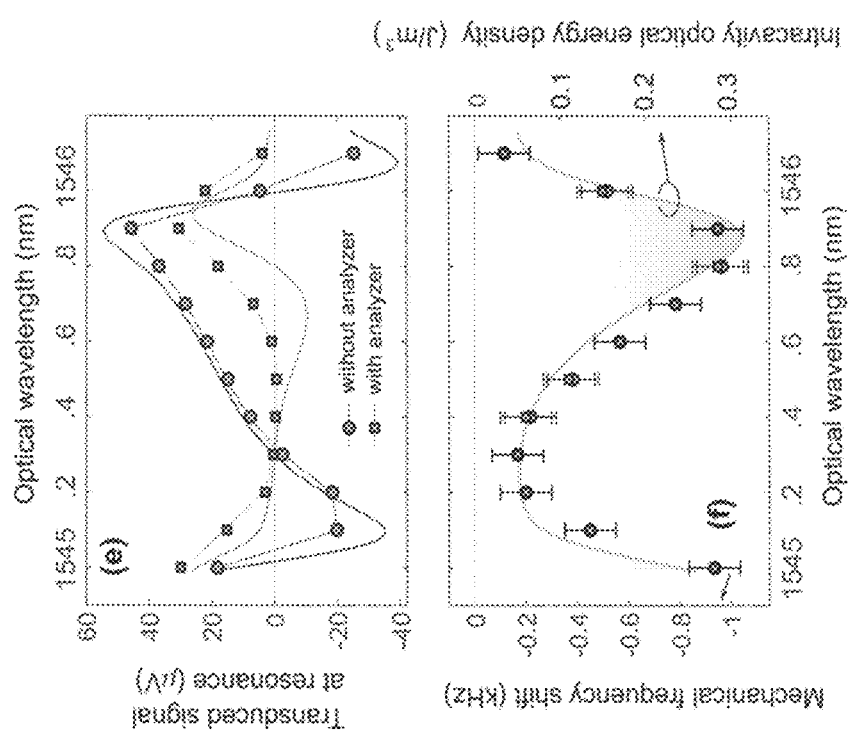
FIG. 4E demonstrates the optical wavelength dependence of the transduced signal peak across one Fabry-Pérot fringe (region in the gray-shaded area of FIG. 2B).
FIG. 4F demonstrates the wavelength dependence of the spring effect.

Such a shift depends linearly on the optical power, as shown in FIGS. 4C-4D, and has a peculiar wavelength dependence. FIG. 4E shows how the resonant peak amplitudes scale with the optical wavelength; the very different spectral shapes of the signal with and without the vertical analyzer confirms the fact that the device is modulating intensity and polarization in a non-trivial way, as shown in FIGS. 2A-2D. Note that the simulations (continuous lines) well reproduce the experimental results (dot-connected full markers). As evident, both measurements with and without an output analyzer (solid symbols) are well reproduced by simulations (solid lines). More interestingly, the spectral shift of the mechanical resonator frequency is strongly correlated with the intracavity photon energy density, as can be seen in the two-axis plot of FIG. 4F. No dependence on the output polarization filtering is observed, and the data are strictly correlated with the intracavity energy density.

In FIGS. 4E and 4F, the X-axes are in nm (nanometers). The Y-axis of FIG. 4E are in µV (microvolts). The left Y-axis of FIG. 4F is in units of kHz (kilohertz). This left axis quantifies the position of the circular and square markers and their error bars. The right Y-axis of FIG. 4F are in units of Jim' (Joule per cubic meter). This axis quantifies the line. This notation is indicated by the two arrows. The squares in both figures are the measurement with the analyzer. The circles are the measurement without the analyzer as indicated in FIG. 4E.

This effect has a genuinely optomechanical nature and can be understood as the optical spring effect: the presence of electromagnetic field in the structured metasurface modifies the effective Hooke constant of the equivalent mass-spring system.

To understand the origin of the mechanical spring effect in our device, it is necessary to go beyond the single resonance analytical model well known in the optomechanics community, due to the presence of a multitude of Fabry-Pérot resonances superimposed with the metasurface resonance. We hence performed a numerical study of the forces acting on the membrane, from which it resulted that the forces are of thermal origin. Indeed, the effects of radiation pressure force and of its gradient are ruled out, as they change sign in the relevant wavelength range and because they are far too small to justify the observed shifts. Moreover, electrostriction effects can be safely neglected even assuming the large photoelastic coefficients of GaAs. Instead, we found an excellent correlation between the intracavity field and the opposite of the frequency shift (FIG. 4F). In essence, a little residual absorption, likely attributable to impurities in the semiconductor, drives a wavelength-dependent heating of the metasurface, with a consequent relaxation of its effective spring constant. The upper bound for temperature rise is estimated to be a fraction of Kelvin, compatible with the simulations of the thermally induced frequency shifts.

Optical spring effect is one of the cornerstones of cavity optomechanics, and one of the main signs of back-action effects; as such it has been observed in several systems. Nonetheless, the interplay between this effect and light polarization has far less been explored; to date, only few theoretical studies can be found on the topic. Our device has proved instead to be a precious test-bed for understanding how the optical forces can be harnessed by means of polarization; moreover, it revealed an intriguing interplay between polarization-dependent optical forces and polarization-dependent optomechanical transduction. The experimental framework is the same as in the previous point, with the difference that here the light wavelength is kept fixed at 1545.8 nm and that the polarization state of the probe beam is continuously tuned across the Poincaré sphere.

Figure 5A:
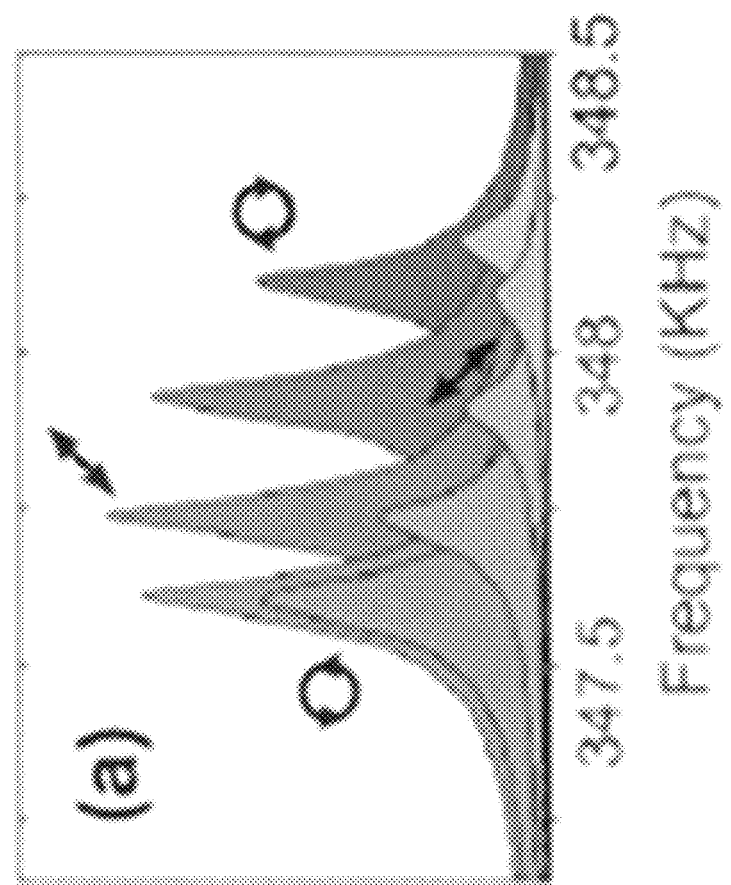
FIG. 5A demonstrates the mechanical resonance evolution as a function of the polarization of input light.
Figure 5C:
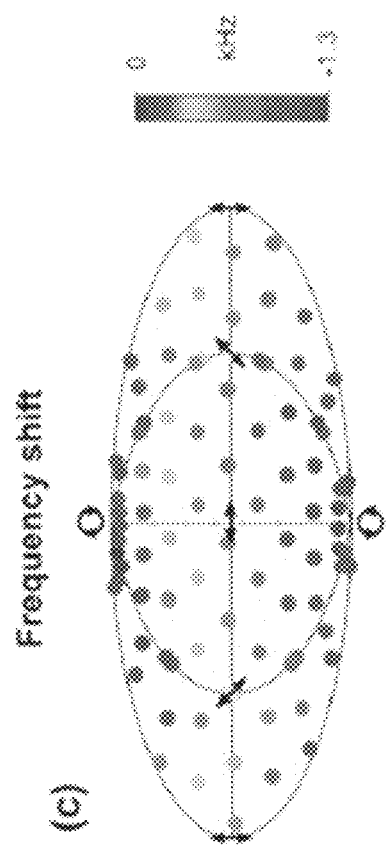
FIG. 5C demonstrates the full polarimetric analysis of the frequency shift shown on the projected Poincaré sphere.
Figure 5B:
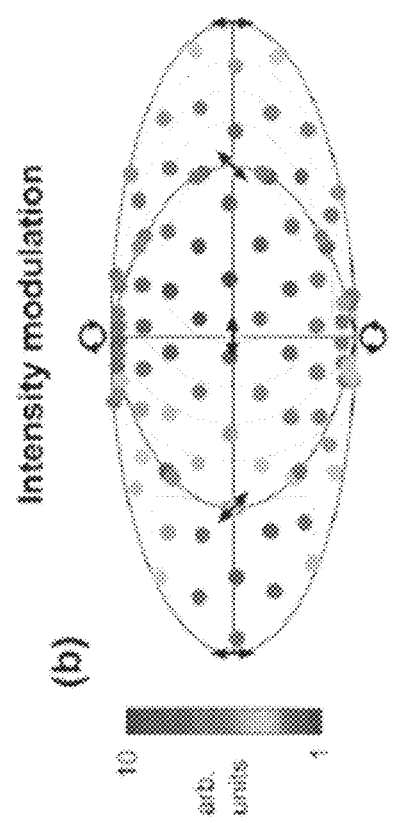
FIG. 5B demonstrates the full polarimetric analysis of the intensity modulation amplitude shown on the projected Poincaré sphere.

The results are reported in FIGS. 5A to 5F demonstrate the observation of chiral spring effect. FIG. 5A illustrates that the mechanical transduction curve changes resonance frequency and magnitude as a function of the light polarization state. In particular, the two opposite circular polarization states correspond to extreme values of frequency shift, while the opposite diagonal linear polarization states correspond to extreme levels of optomechanical transduction. Note that here the transduced signal is entirely given by intensity modulation, as no analyzer is placed after the sample. FIG. 5B demonstrates the full polarimetric characterization of intensity modulation: each dot corresponds to an input polarization state set in the experimental process, while the gray lines are the level curves of zero and first order spherical harmonics. It should also be noted that the arbitrary scale point of 10 corresponds to the red, while the arbitrary scale point of 1 corresponds to the violet.

Figure 5D:
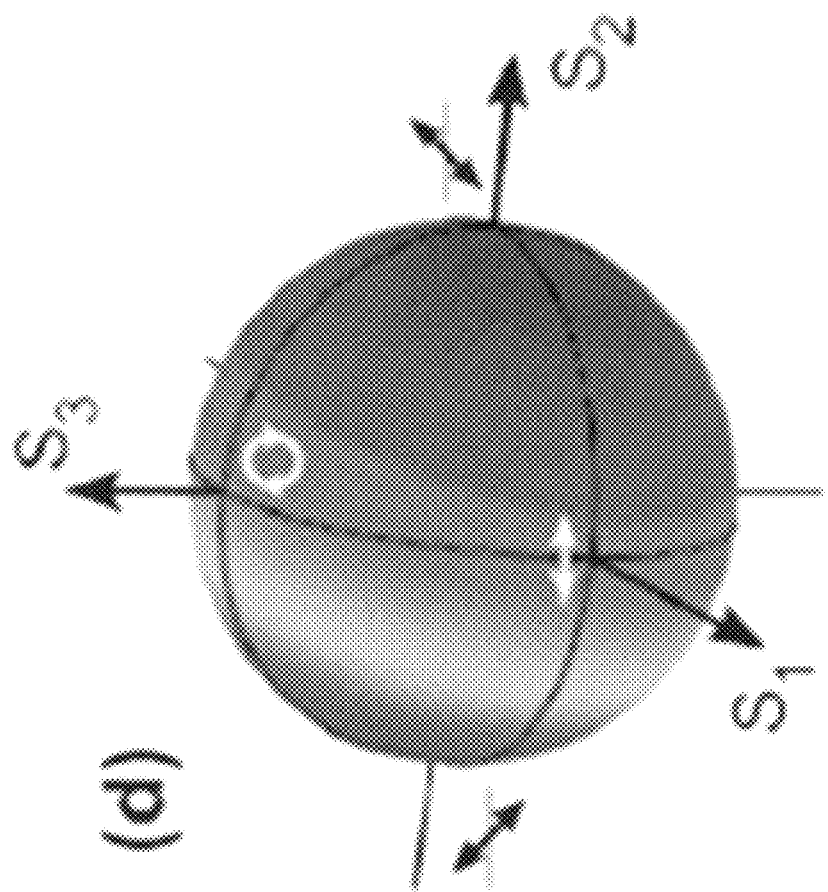
FIG. 5D depicts a simulation validating the experimental results in a 3D representation of the results of FIG. 5E.
Figure 5F:
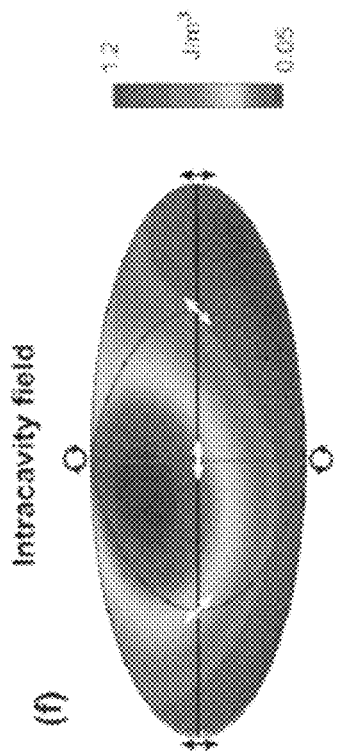
FIG. 5F depicts a simulation validating the experimental results plotted in the same configuration as the experimental data (FIG. 5C).
Figure 5E:
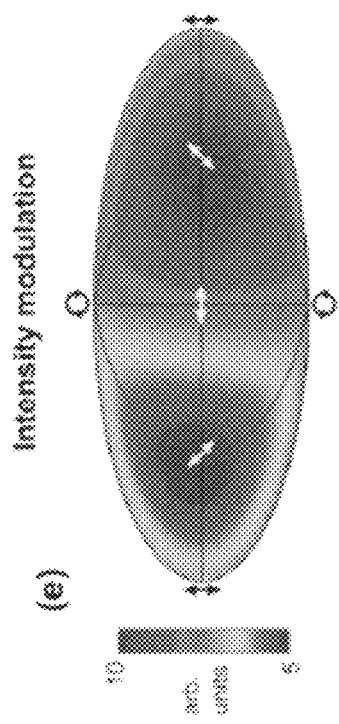
FIG. 5E depicts a simulation validating the experimental results plotted in the same configuration as the experimental data (FIG. 5B).

FIGS. 5D to 5F demonstrate a validation of the experimental results by the simulations (d-f). By comparison, FIG. 5E illustrates what is expected from the fully-vectorial electromagnetic model while FIG. 5D provides an alternative representation on the three-dimensional Poincaré sphere. In this figure, right hand side of the sphere is red and the left hand side is blue. As can be seen, there is good agreement between experiment and simulations. Considering now the spring effect, FIG. 5C presents the mechanical frequency shift on the full polarization space. In FIG. 5C, the 0 kHz corresponds to the violet color and the −1.3 kHz to the red. As previously observed, the shift (changed in sign) is correlated with the intracavity field [FIG. 5F], corroborating the picture that the spring effect has a thermo-optic origin. An additional feature of both optomechanical transduction and frequency shift is that they have a dipole-like dependence on the sphere. In other words, the quantities $\Delta I/I_0$ and $\Delta \omega_m$ have contributions from the zero and the first order spherical harmonics, as expected from functions that are bilinear in the polarization Jones vector. Frequency shift is negatively correlated with the intracavity field, confirming the thermal nature of the chiral spring effect. We finally notice that the intensity modulation and the frequency shift have a different—and almost complementary—dependence on the polarization state; as an example, comparing the two polarimetric maps of FIGS. 5E and 5F, we have almost zero circular dichroism modulation (the intensity modulation at the R and L poles are roughly the same), accompanied by a strong dependence of the frequency shift from the chirality of light (zero at the R pole, maximum at the L pole). This means that, in principle, the optomechanical chiral effects can be exploited to implement a polarimeter, based on a completely different mechanism with respect to ordinarily employed devices and with the potential to be orders of magnitude faster.

In conclusion, these experiments demonstrate that the polarization, and in particular handedness-sensitive optical response of a multiple metasurface device, in particular containing a chiral metasurface, can be coupled to nanoscale mechanical motion. When this is done, fast linear and circular polarization modulation is realized; also, the mechanical resonant features are affected by the chirality of a drive light beam. With the potential to be scaled up to high-frequency mechanical mode (~GHz) coherently excited by Surface Acoustic Waves, the invented device has the potential to strongly impact the field of polarization control. Furthermore, the polarization nonlinearity induced by the nontrivial mechanical interaction can pave the way to complex and fast operation on the polarization state of light, as polarization squeezing. Given the ubiquity of polarized light in fundamental science and in applications, the inventors believe that the proof-of-principle experiment in this specification will open new avenues in several fields such as biophotonics, material science, drug discovery, and telecommunications.

Figure 6:
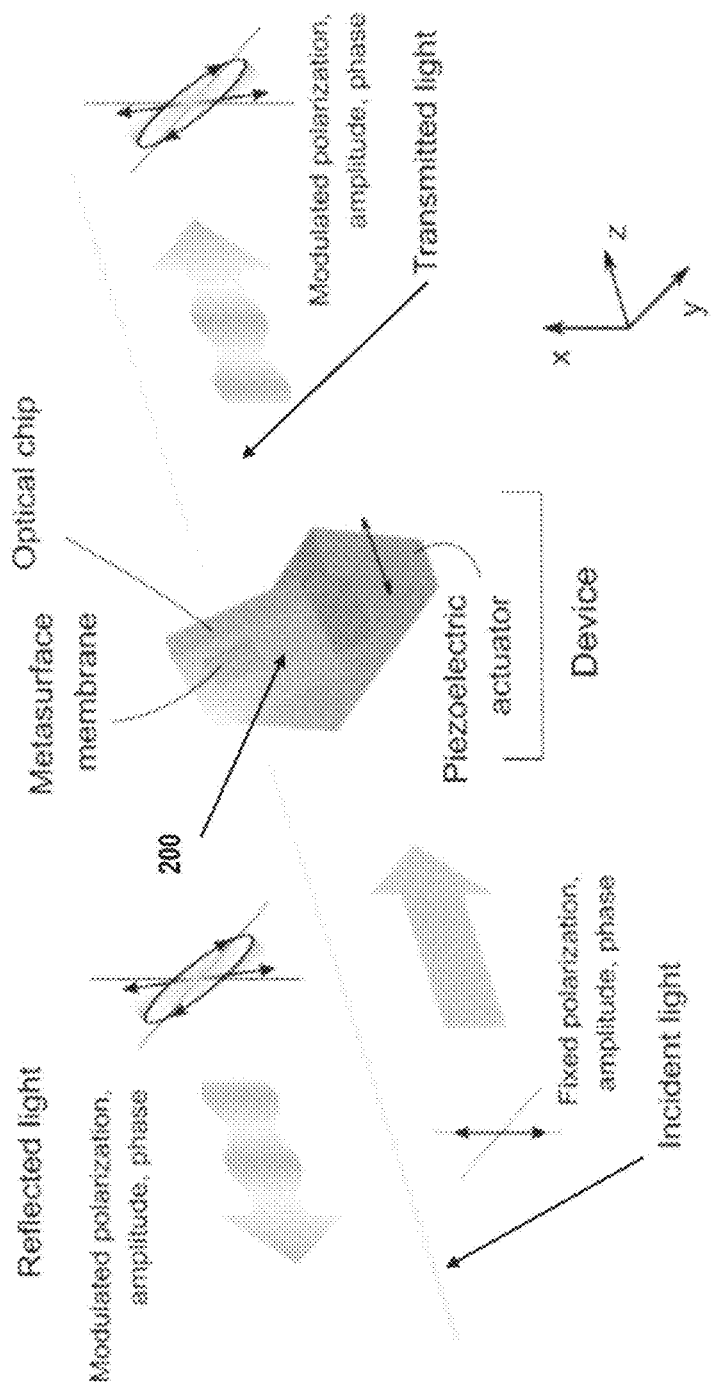
FIG. 6 depicts the device used to conduct the experiments with the X-Y-Z coordinates.

A preferred embodiment regards a device that is capable of modulating simultaneously, but possibly independently, the phase, the amplitude, and the polarization of light, as illustrated in FIG. 6. The modulated light can be reflected from the device, transmitted from the device, or both. In that figure it is also reported a possible practical implementation of the device, that consists of an optical chip containing a metasurface mounted on a piezoelectric actuator.

It is in view of the above experiments and nomenclatures that the invented device is more completely described.

The invention regards a device intended to act on electromagnetic fields, consisting of a series of spaced metasurfaces, at least one of which is free to move.

In this specification a metasurface is defined as an object aimed at manipulating the electromagnetic radiation, with the following features: (i) it has two dimensions (width, length) in the X-Y plane much larger than the third dimension (thickness) which is in the Z direction and perpendicular to the X-Y plane and is less than or equal to the wavelength ($\lambda$) of the involved electromagnetic radiation; (ii) the width and length are much larger (typically more than ten times) than the wavelength ($\lambda$) of the involved electromagnetic radiation; (iii) the metasurface contains electromagnetic inhomogeneity, i.e. it is a region where the complex tensors defining the permittivity ($\varepsilon$) and permeability ($\mu$) show variations, in either one, two, or three of the spatial directions X-Y-Z.

A trivial metasurface is one in which the permittivity ($\varepsilon$) and permeability ($\mu$) show variations in only the Z direction.

A non-trivial metasurface is one in which the permittivity ($\varepsilon$) and permeability ($\mu$) show variations in the X, Y and Z dimensions.

Typical metasurfaces have a spatial distribution of materials generating an electromagnetic inhomogeneity. Examples of these spatial distribution of materials are: (i) blocks, often in the form of a parallelepiped or of a cylinder, supported by a substrate or membrane; (ii) holes drilled or cut on to a membrane. The blocks may be of any material which create the inhomogeneity, such as a metal or a dielectric. The holes are also often in the form of a parallelepiped or of a cylinder, or combination thereof. One example of a hole is the "L" shape used in the working device. These are only descriptive cases and do not exhaust in any way the possibilities, since a large number of degrees of freedom are inherently included in the definition of metasurface given above. The definition of metasurface includes the ordinary concept of interface between two different dielectric materials, hence including the concept of surface of a material (i.e., the interface between a solid or liquid material and the air or the vacuum). We will also have conceived of a non-trivial metasurface, which is a metasurface that differs from an ordinary interface.

Figure 7:
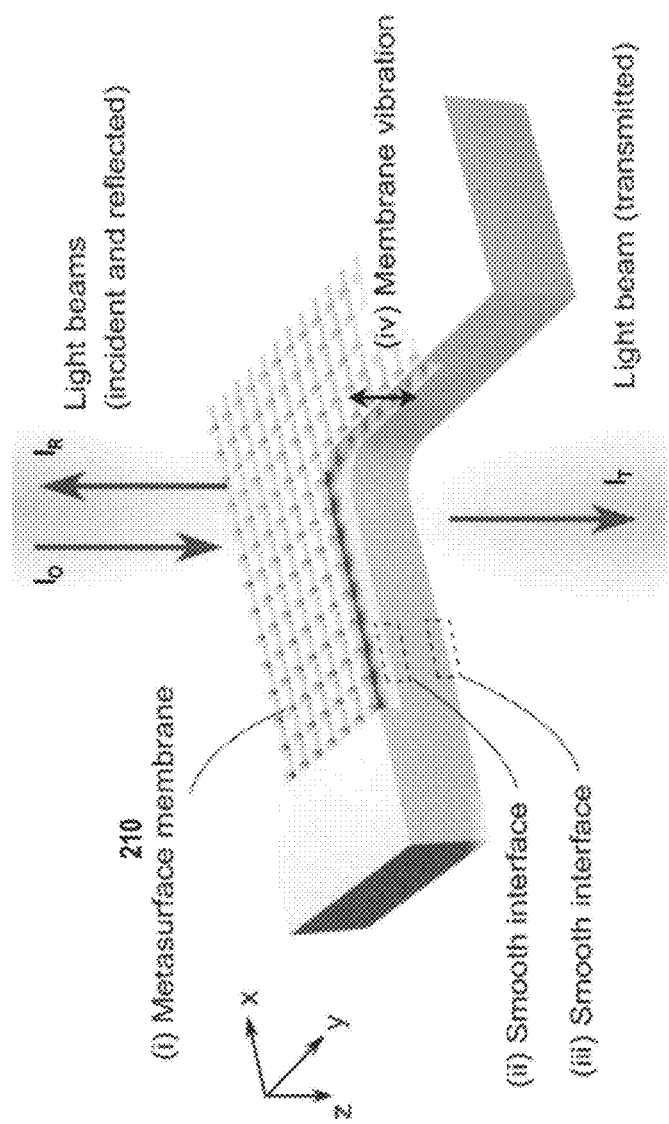
FIG. 7 is the schematic of just the enlarged device without the piezoelectric actuator with the X-Y-Z coordinates.

Further details of the optical chip of FIG. 6 are represented in FIG. 7: a membrane, patterned with an array of holes, constitutes a first metasurface (FIG. 7(i)).

In the example of FIG. 7, the first metasurface, (MS), is placed at a distance from an optionally smooth, partially reflecting interface, which plays the role of second metasurface (FIG. 7(ii)). A third optionally smooth, partially reflecting interface, which plays the role of third metasurface (FIG. 7(iii)) is also present. Using the nomenclature discussed below when there must be more than 2 metasurfaces, the first metasurface, ($MS_1$), is placed at a distance from an optionally smooth, partially reflecting interface, which plays the role of second metasurface, ($MS_2$) (FIG. 7(ii)). A third optionally smooth, partially reflecting interface, which plays the role of third metasurface, ($MS_3$) (FIG. 7(iii)).

In the present embodiment the metasurface membrane and the optionally smooth interfaces belong to the same chip and are fabricated by means of gallium arsenide thin film technology. Other technologies can however be employed to implement the same device concept.

A light beam incident on the patterned membrane side (but the invention works in general for light incident on any side) traverses the metasurface, and performs multiple round-trips within the cavity formed by the metasurface and the other interfaces. As a result of the interaction between the incident light and the metasurface, and because of the multiple round trips between the metasurface and the interfaces, the polarization, amplitude and phase of the reflected and transmitted light are modified with respect to the incident light.

Because the metasurface membrane (FIG. 7($i$)) is free to move, any motion of the membrane itself (FIG. 7($iv$)) modifies the light-matter interaction process, in a controlled and predictable way, as detailed in the following paragraph. This modification, that can originate from any mechanism that drives the motion of the metasurface membrane (in the embodiment of FIG. 6, a piezoelectric actuator), results in a modification of the polarization, amplitude and phase of reflected and transmitted light, which is an Optomechanical metasurface light modulator.

The general structure of the invention, is schematically described in FIG. 8, and is constituted as follows: A generic plurality of metasurfaces with a total number of L metasurfaces, $MS_1 \ldots MS_L$, are described as $MS_{n+1}$ when n is an integer ranging from 1 to L−1. The number L is an integer number that identifies the number of metasurfaces. The range of L can be from 3 to 100, 3 to 30, 3 to 25, 3 to 20, 3 to 15, 3 to 10, 3 to 6, 3 to 5, 3 to 4, and L can be 3, 4, 5, 6, or 7. The range of L can also be from 4 to 100, 4 to 40, 4 to 25, 4 to 20, 4 to 15, 4 to 10, 4 to 6, and 4 to 5. The range of L can also be from 5 to 100, 5 to 50, 5 to 25, 5 to 20, 5 to 15, 5 to 10, and 5 to 6. These L metasurfaces have an outer reference plane, $RP_1$, $RP_2$, $RP_L$, with an inside reference plane, $RP_1'$, $RP_2'$, $\ldots RP_L'$ on the opposite side of the respective metasurface and parallel with each other. These metasurfaces are spaced between each other by means of a number (L−1) spacer regions $SP_1 \ldots SP_{L-1}$ having corresponding thicknesses at any given time of $d_1 \ldots d_{L-1}$. The thickness of a spacer region $SP_n$ is the maximum distance between $RP_n'$ and $RP_{(n+1)}$ measured in the Z dimension which is perpendicular to both reference planes n and n' described above.

Figure 8:
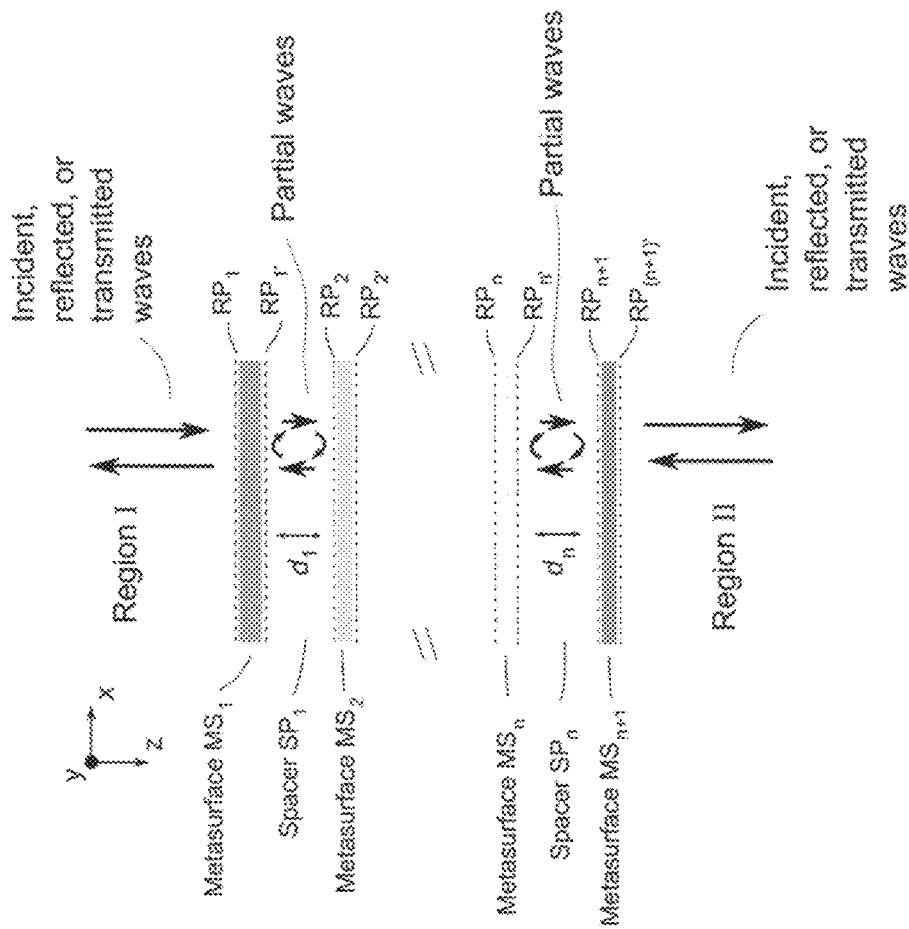
FIG. 8 is the general schematic of the multiple metasurface device.

It should be noted that the last metasurface in FIG. 8 is $MS_{(n+1)}$. When this nomenclature is used, n equals L−1, or total number of metasurfaces minus one.

The special case exists when the static distance=0. In this case, the two metasurfaces are adjacent and move together. For the device to work, there must be at least one static distance which is greater than 0.

When the system is at rest, i.e. in the absence of an external force the metasurfaces are not moving and thickness of the spacer regions are their respective corresponding static distances ($sd_1$, $sd_2$, $\ldots sd_{L-1}$). The spacer region does not have to be air, but could be a solid metal or plastic or other material.

According to definitions hereinabove, at least one metasurface $MS_n$ of the metasurfaces $MS_1 \ldots MS_L$, must be non-trivial.

The spacer regions are constituted of a homogeneous material (i.e. a material whose permittivity ($\varepsilon$) and permeability ($\mu$) do not show spatial variation) and their thicknesses may be zero. At least one spacer thickness corresponding to $d_1 \ldots d_{L-1}$ is mechanically modifiable. One operating principle of the invention, also described in FIG. 8, relies on the propagation of partial electromagnetic waves that may perform round-trips, as illustrated by the arrows in FIG. 8, in a process reminiscent that of Fabry-Pérot resonances. The last reference planes in the series can be noted as $RP_L$, $RP_L'$ where L is the total number of metasurfaces as discussed above.

While not to be bound by any theory it is believed that at each of these planes the electric field can be defined in terms of the amplitudes of forward and backward partial propagating waves, i.e., in terms of the collection of complex numbers $E_n^{x,+}$, $E_n^{y,+}$, $E_n^{x,-}$, $E_n^{y,-}$ where the signs (+ and −) refer to the forward/backward nature of the partial wave propagating along z; the letters (x and y) identify the polarization of the partial wave, and the index n (that can assume the values 1, 2, $\ldots$ L) identifies the reference plane ($RP_1$, $RP_2$, $\ldots RP_L$). Analogous notation with n replaced by n' identifies the wave amplitudes at reference planes $RP_1'$, $RP_2'$, $\ldots RP_L'$.

For notation convenience it is useful to group pairs of wave amplitudes according to $$E_n^+ = \begin{pmatrix} E_n^{x+} \\ E_n^{y+} \end{pmatrix} \tag{1}$$

and analogously with n replaced by n' and/or with the plus sign + replaced by the minus sign − in the whole expression. With this notation, the operation principle of the device is clearly described by means of the transfer matrix formalism as described in B. E. A Saleh, M. C. Teich, *Fundamentals of Photonics*, Wiley 2007, which links the wave amplitudes at one reference plane to those at the next:

$$\begin{pmatrix} E_{n'}^+ \\ E_{n'}^- \end{pmatrix} = M_n \begin{pmatrix} E_n^+ \\ E_n^- \end{pmatrix} \tag{2}$$

$$\begin{pmatrix} E_{n+1}^+ \\ E_{n+1}^- \end{pmatrix} = N_n \begin{pmatrix} E_{n'}^+ \\ E_{n'}^- \end{pmatrix} \tag{3}$$

The 4×4 matrix $M_n$ that appears in Eq. (2) completely describe the response of the metasurface $MS_n$: it depends on the permittivity ($\varepsilon$) and permeability ($\mu$) distribution in the spatial region of metasurface $MS_n$. Matrix $M_n$ has in general the form $$M_n = \begin{pmatrix} A_n & B_n \\ C_n & D_n \end{pmatrix} \tag{4}$$

Where $A_n$, $B_n$, $C_n$ and $D_n$ are 2×2 matrices. If the metasurface $MS_n$ is non-trivial, matrices $B_n$ and $C_n$ are in general non-zero, and matrices $A_n$ and $D_{11}$ are in general not a multiple of the identity matrix; this will occur for at least one of the values of n, i.e., that (those) corresponding to the non-trivial metasurface(s). The design of the non-trivial metasurfaces are chosen by appropriate engineering of the permittivity ($\varepsilon$) and permeability ($\mu$) distribution in a certain region of the complete device, and dictate the specific device functionality.

The matrices $N_n$ have the form $$N_n = \begin{pmatrix} \mathbb{1} \cdot e^{ik_n d_n} & \mathbb{0} \\ \mathbb{0} & \mathbb{1} \cdot e^{-ik_n d_n} \end{pmatrix} \tag{5}$$

where $k_n$ is the wavevector of electromagnetic radiation propagating in the spacer region $SP_n$ and $d_n$ is the thickness of the spacer region $SP_n$. The symbol $\mathbb{1}$ represents the 2×2 identity matrix and the symbol 0 represents the 2×2 zero matrix. For the purpose of the device functionality, one is interested in the global electromagnetic response of the device, i.e. in the relation that links the waves at $RP_1$ with those at $RP_{L'}$. This is given by the transfer matrix of the full device Macy, that operates as follows:

$$\begin{pmatrix} E_{L'}^+ \\ E_{L'}^- \end{pmatrix} = M_{dev} \begin{pmatrix} E_1^+ \\ E_1^- \end{pmatrix} \quad (6)$$

Matrix Mae, can be constructed explicitly by the formula $$M_{dev} = M_L N_{L-1} M_{L-1} \ldots N_2 M_2 N_1 M_1 \quad (7)$$

The relation of Eq. (6) can be inverted, again described in B. E. A Saleh, M. C. Teich, *Fundamentals of Photonics*, Wiley 2007 to yield the scattering matrix S, that links the waves that enter the device with those that exit the device:

$$\begin{pmatrix} E_1^- \\ E_{L'}^+ \end{pmatrix} = S \begin{pmatrix} E_1^+ \\ E_{L'}^- \end{pmatrix} \quad (8)$$

Matrix S has a direct connection with the device functionality, since it contains four 2×2 submatrices that describe the amplitude, phase and polarization response of the device in reflection and transmission:

$$S = \begin{pmatrix} R_{I \to I} & T_{II \to I} \\ T_{I \to II} & R_{II \to II} \end{pmatrix} \quad (9)$$

Here we introduced the labels I and II that identify the regions above and below the device (FIG. 8). In optics the matrices $R_{I \to I}$, $R_{II \to II}$, $T_{I \to II}$, and $T_{II \to I}$ are also defined as Jones matrices for the processes of reflection or transmission, see D. Goldstein, *Polarized Light*, Marcel Dekker 2003.

The chain of equations (1), ... (9) describe and define the operation principle of the optomechanical metasurface light modulator. In detail: a mechanical actuation acting at least on one of the metasurfaces modifies at least one of the spacer thicknesses $d_n$ from its static value $sd_n$; by eq. (5) this induces a modification of at least one of the matrices $N_n$; by eq. (7) also matrix Mao, is affected; matrix S is affected as well; by eq. (9) matrices $R_{I \to I}$, $R_{II \to II}$, $T_{I \to II}$, and $T_{II \to I}$ are also affected; by the definition of Jones matrices, the device acts as an amplitude, phase, and polarization modulator.

The operation of a specific implementation of the device relies on a proper design of the metasurface(s) and of the spacer thicknesses in order to address the desired form of matrix S as well as of its dependence of the parameter(s) $d_n$. This task is usually accomplished by means of a variety of simulation tools that connect the matrices A, B, C and D (Eq. 4) of a metasurface to the permittivity ($\varepsilon$) and permeability ($\mu$) distribution within the metasurface region: FEM methods (COMSOL Multiphysics, ANSYS, CST Microwave Studio, JCMWave); Rigorous Coupled Wave (RCWA) method (GSOLVER, S4, RETICOLO, PPML); Finite Difference in the Time Domain (FDTD) (Lumerical, MEEP, RadarFDTD) are examples of the some of the simulation tools. In principle, inverse design tools may be used to help the designer. See S. Molesky, Z. Lin, A. Y. Piggott, W. Jin, J. Vuckovic, A. W. Rodriguez, *Nat. Photonics* 2018, 12, DOI 10.1038/s41566-018-0246-9.

In the treatment given above, and in FIGS. 6-8, the light beams are represented perpendicularly with respect to the device surface. This has not however to be interpreted as a limitation; the device can operate also at non-normal incidence, as well as with diffracted or diffused beams. In this case the analytical treatment (eqs. 1-9) should be partially modified, but the substance of the operating principle remains the same.

The mechanical actuation of the movable metasurface(s), and the movable nature of the metasurface(s) constituting the device, may originate from different mechanisms and technologies, depending on the specific implementation of the invention concept. For instance, as depicted in FIGS. 6 and 7, a device may include a movable metasurface in the form of a patterned membrane fabricated on a gallium arsenide optical chip; the mechanical actuation is provided by a piezoelectric actuator cemented with the optical chip. However, other technologies may be employed. For instance, the metasurface can be fabricated by employing other solids: monoatomic, alloy, or other chemical compounds containing atomic species, usually transparent (dielectric) but also strongly opaque (metallic): (Au, Ag, Si, SiN, GaAs, ZnSe, GeSbTe); polymers (polymethylmethacrylate, liquid crystal elastomers); two-dimensional materials (carbon in the graphene form, boron nitride), and any of their combination. The movable metasurface(s) can be monolithically integrated within a chip that also provides the fixed metasurface(s), as in FIG. 7; however, hybrid integration technologies can also be employed. It should be noticed that the movable metasurface does not necessarily take the form of a membrane, what is only required is that at least one of the distances $d_n$ of FIG. 8 between the metasurfaces constituting the device is modifiable by a control action.

Figure 9:
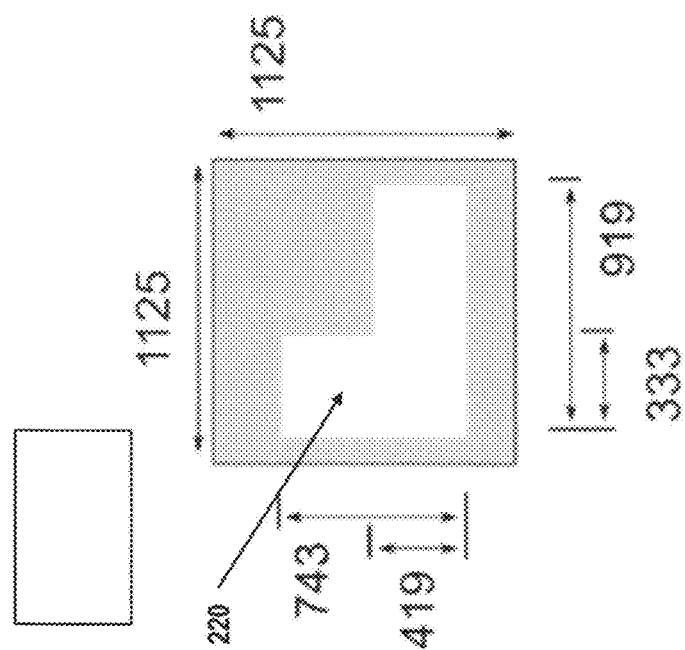
FIG. 9 depicts the measurements and dimensions of one of the holes in the metasurface used in the experiments.
Figure 10:
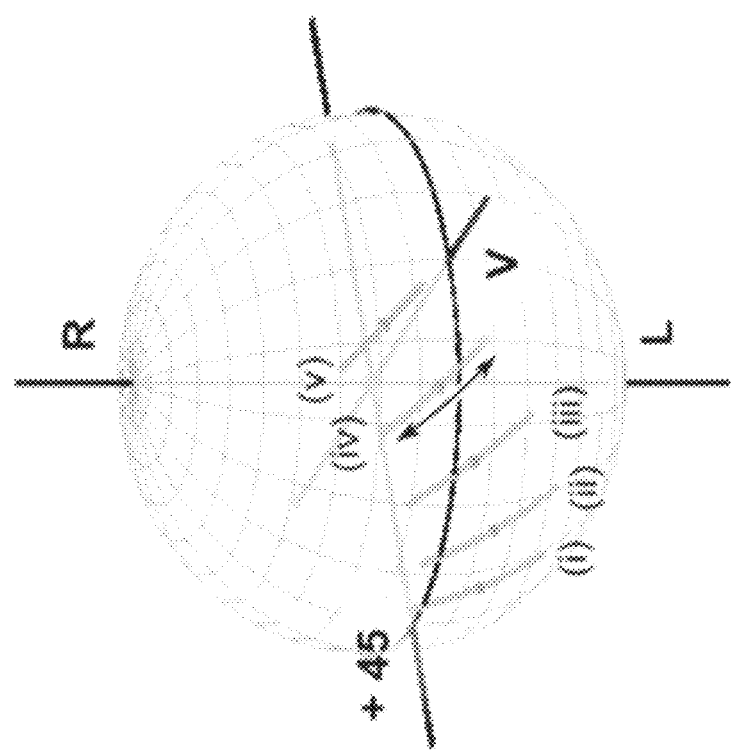
FIG. 10 illustrates the path on the Poincaré sphere of the polarization state of the reflected light that is obtained when the piezo actuator applies force to the chip.

The embodiment of a non-trivial metasurface consists of an array of L-shaped holes, etched in a gallium arsenide membrane with 220 nanometer thickness (FIG. 9). The membrane is spaced by 1450 nm from the smooth interface. FIG. 10 illustrates the path on the Poincaré sphere of the polarization state of the reflected light that is obtained when the piezo actuator on which the metasurface chip is mounted is driven by a signal of the order of 1 Volt. The range of external voltage can be in the range of 0.000001 V to 10V, with 0.1 to 5 V being a working range, and 0.1 to 2V being another working range of voltage. Here, the labels (i)-(v) identify equally spaced wavelengths ($\lambda$) in the range 1548.0-1551.9 nanometers. Accordingly, (i) identifies the wavelength 1548 nm, (ii) identifies 1548.975 nm, (iii) identifies 1549.950 nm, (iv) identifies 1550.925 nm, and (v) identifies 1551.9 nm. R stand for "Right", L stands for "Left" and V stands for 'Vertical".

The working principle is that at least one of the metasurface(s) must move. This can be done in several ways: For instance, a possible implementation is that of a series of glass plates, at least one of them patterned to form a non-trivial metasurface, moved by motors. Another way is to include in the device a mechanically compliant, elastic (meta)surface. Its elastic modulus, mass and shape will define the frequency and quality factor of the mechanical resonance(s), and eventually the strength of optical modulation as well as the modulation frequencies achievable by the device. In the prototype, when working at ambient conditions, the metasurface membrane had a mechanical resonance frequency centered approximately in the 300 kHz range, with an overdamped quality factor. Enclosing the sample in a vacuum chamber increased the quality factor to ~2000.

Figure 11:
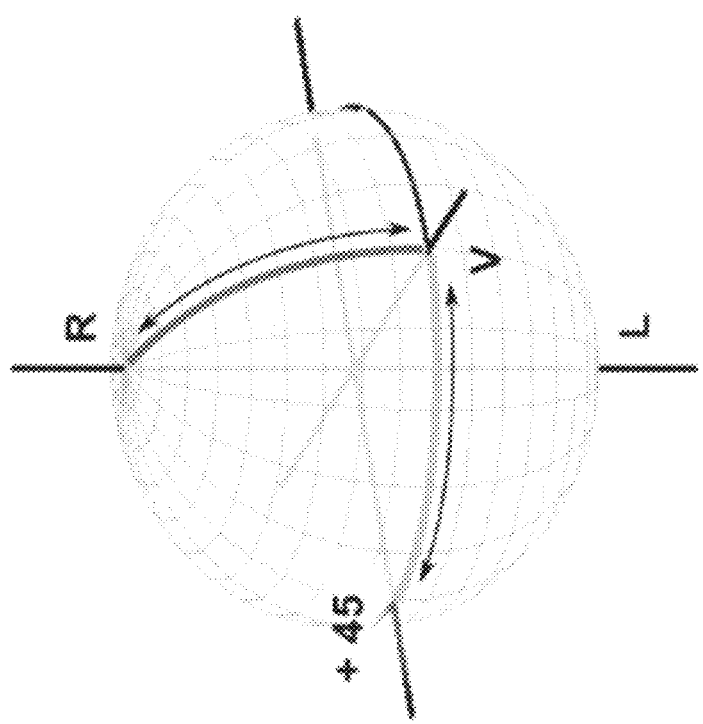
FIG. 11 depicts polarization state tuning along the main directions on the Poincaré sphere.

The proposed device, subject to appropriate engineering, may allow for instance to implement polarization state tuning along the main directions on the Poincaré sphere, as illustrated in FIG. 11. Similarly, intensity and phase modulation can be achieved.

However, by appropriate material choice, and shape engineering, the mechanical response can be tuned, across a wide frequency range [potentially up to the GHz range exploiting Lamb-like waves or Surface Acoustic waves].

The advantages of the multiple metasurface are discussed below.

As already discussed, light is characterized by three parameters: amplitude, polarization and phase. The action of an optical device on these characteristics is summarized in the Jones matrices; let's consider here a device operating in reflection such that the interesting matrix is $R_{I \to I}$. This matrix contains four complex numbers, i.e. eight real numbers p, q, . . . , w arranged as follows:

$$R_{I \to I} = \begin{pmatrix} p + iq & r + is \\ t + iu & v + iw \end{pmatrix}$$

where i stands for the imaginary unit ($i=\sqrt{-1}$). As already described, the matrix $R_{I \to I}$, and consequently the numbers p, q, . . . , w depend on the metasurface distances $d_1 \ldots d_{L-1}$.

In the case of an embodiment with only two metasurfaces, there is only a single distance $d_1$ that can be used as a single tuning parameter to implement the purpose of the invention, i.e. the metasurface light modulator. The fact that there is a single parameter to act upon limits the possible operations of the tunable metasurface. Indeed, suppose that the distance is varied from $d_1$ to $d_1'$: as a consequence, the $R_{I \to I}$ matrix components will change from p, q, . . . , w to some other numbers p', q', . . . , w'. This operation may be useful for some limited purposes.

With our invention there is instead the possibility to act simultaneously on a multiplicity of controls $d_1, \ldots, d_{L-1}$, with the consequent possibility to act independently on several parameters among p, q, . . . , w, (provided of course that an appropriate design of the device has been made). In principle, with nine metasurfaces $MS_1 \ldots MS_9$ and eight control parameters $d_1 \ldots d_8$ it is possible to act independently on all the eight target parameters p, q, . . . , w. In other words, our device can be described as having the exact number of degrees of freedom required to implement the desired kind of light modulation in the full space described by amplitude, phase and polarization, and encoded in the Jones matrices.

A device embodying the principles discussed above was constructed having 3 metasurfaces: $MS_1$, $MS_2$, and $MS_3$, separated by spacers $SP_1$ and $SP_2$.

The specifications of the metasurfaces given in terms of the matrices $M_1$, $M_2$ and $M_3$ describing the metasurfaces $MS_1$, $MS_2$, and $MS_3$ are given below according to the nomenclature described at [0122]. The values were in a tolerance of 1%.

| $M_1 =$ | | | |
|---|---|---|---|
| 0.0083 + 1.0386i | −0.0046 + 0.0410i | 0.0037 − 0.0932i | 0.0325 − 0.2666i |
| 0.0018 + 0.0235i | 0.0541 + 1.0379i | 0.0205 − 0.2700i | 0.0039 − 0.0035i |
| −0.0182 + 0.0858i | −0.0067 + 0.2777i | 0.0203 − 1.0415i | 0.0088 + 0.0012i |
| −0.0179 + 0.2737i | −0.0130 − 0.0013i | −0.0014 + 0.0167i | 0.639 − 1.0314i |

| $M_2 =$ | | | |
|---|---|---|---|
| 0.6389 | 0 | 0.3611 | 0 |
| 0 | 0.6389 | 0 | 0.3611 |
| 0.3611 | 0 | 0.6389 | 0 |
| 0 | 0.3611 | 0 | 0.6389 |

| $M_3 =$ | | | |
|---|---|---|---|
| 1 | 0 | 0 | 0 |
| 0 | 1 | 0 | 0 |
| 0 | 0 | 1 | 0 |
| 0 | 0 | 0 | 1 |

Figures 12A, 12B:
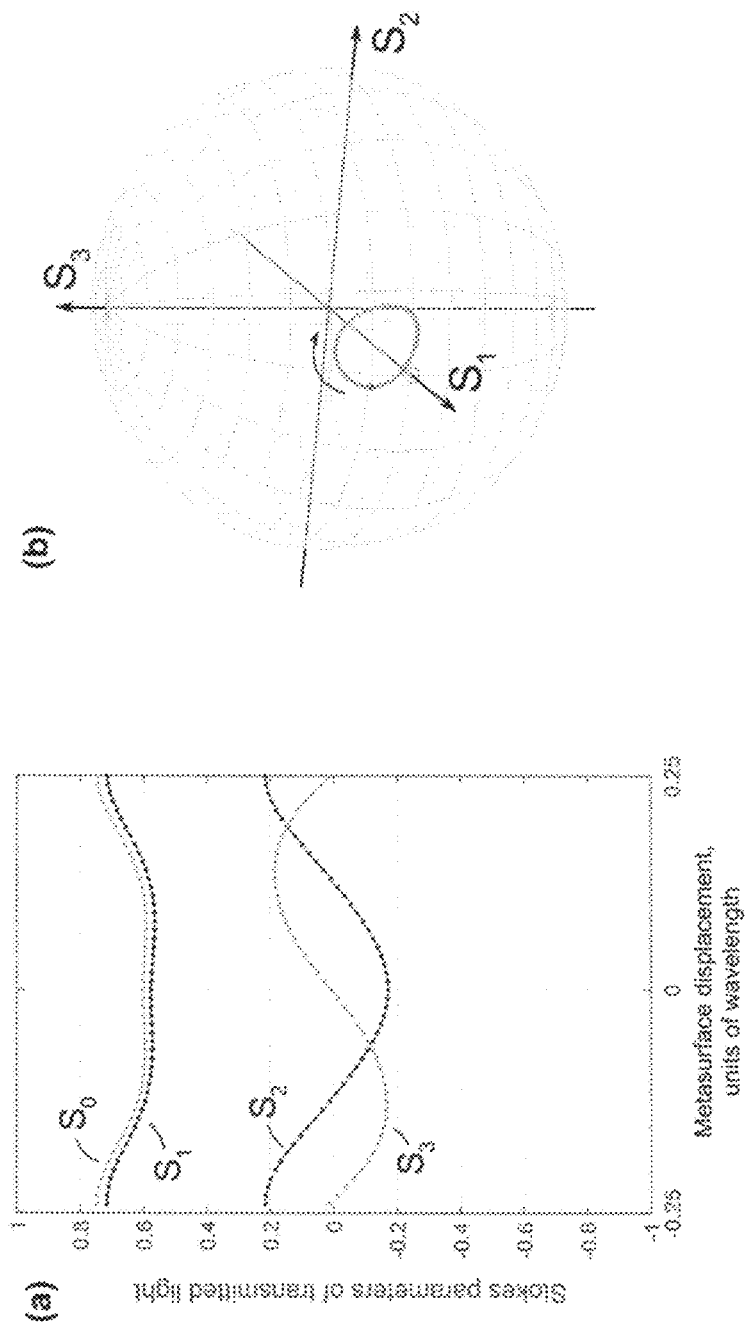
FIG. 12A depicts the change of the Stokes' parameters upon the metasurface displacement for a device embodiment.
FIG. 12B shows the same result of FIG. 12A, represented on the Poincaré sphere.

FIGS. 12A and 12B show the polarization modulation obtained with the above device. This optomechanical modulator modulated the light in the form or a circle like path in the Poincaré space with little intensity loss and small intensity modification.

This particular embodiment implemented a modulation of the Stokes parameters ($S_0$, $S_1$, $S_2$, $S_3$) that follow the curves in FIG. 12A. The specificity of the present embodiment is that the modulation of Si is noticeably different from that on $S_2$ and $S_3$. Furthermore, $S_2$ and $S_3$ describe similar curves although displaced with respect to each other. The operation of the device can also be understood by looking at the path formed by the representative point in the polarization space $\{S_1, S_2, S_3\}$ in FIG. 12B. The input polarization state is identified by the empty circle ($S_1=1$; $S_2=S_3=0$); the output polarization state, which varies while the metasurface displacement is varied (as indicated by the arced arrow), described a circular path.

Methods

Sample fabrication: Dielectric metasurface has been fabricated starting from an epitaxial heterostructure constituted of a AlGaAs/GaAs bilayer on a GaAs double-polished wafer. Al concentration in AlGaAs layer is 50%, thicknesses of the layers are, respectively, 1455 and 210 nm as determined by spectroscopic ellipsometry. Few nm of oxide (n≈1.5) are found on the GaAs/air interface. The L-shaped hole array is defined (created) by electron beam lithography (All Resist AR 6200 CSAR resist, exposure with a Zeiss Ultraplus SEM, 30 kV acceleration, pattern generated with Raith ELPHY). Subsequent dry etching (Sentech ICP-RIE reactor, $Cl_2/BCl_3/Ar$ 6/1/10 sccm, 25 W/100 W on HF and ICP plasmas, ≈1 nm/s etch rate) and wet etching (concentrated HF solution, 1 min dip) led to the released membrane. The array is constituted by 50 equispaced periods.

Optical modulation experiment: The optical bench follows the scheme reported in FIG. 1. There, a pointing HeNe laser made collinear with the main telecom laser through a dichroic mirror is not illustrated, as well as the vision system (CCD plus zoom lenses) which is also not reported. The waveplates, which in FIG. 1 are placed before the beamsplitter for illustrative purposes, are in reality placed either before or after it depending on the experiment: for the measurements of FIGS. 2 and 4, they are placed before the beamsplitter; for those of FIGS. 3 and 5 they are placed after; the reason is that the retardance of the beam splitter was not known. The focusing lens is an achromatic doublet with 75 mm focal length. All the components have been purchased from Thorlabs, with the exception of the tunable laser and the detector (New Focus, respectively, Velocity TLB-6700, 1520-1570 nm and IR nanosecond photodetector 1623). Detection is provided by a Zurich Instruments UHF lock-in instrument in the case of coherent measurements. Broadband spectra (FIGS. 2 and 3) are collected by scanning the laser wavelength and collecting the data with an oscilloscope. Wavelength was monitored by sending the light exiting from the secondary port of the beam splitter on a Fabry-Pérot etalon constituted by a double-polished bare GaAs wafer.

Vibrometric measurement: The vibrometric map reported in FIG. 1e has been collected by means of a Polytec Laser Doppler Vibrometer instrument. The quality of the map is slightly degraded due to the presence of holes on the membrane and to the absorption of GaAs at the wavelength ($\lambda$) the laser employed by the instrument ($\lambda$=523 nm).

Numerical analysis: Electromagnetic simulations have been performed by a hybrid scattering-transfer matrix method plus rigorous coupled wave analysis. MATLAB code has been extensively used, also with built-in optimization algorithms to target the resonance frequency. The electromagnetic module of finite-element COMSOL Multiphysics solver has been employed to produce the map of FIG. 1D. The continuum mechanics module of COMSOL has instead been employed to determine the vibration eigenmodes of the membrane (FIG. 1F).

What is claimed is:

1. An optomechanical modulator for modulating the Jones vector of polarized electromagnetic radiation, including light, comprising:
    a series of at least three essentially parallel, aligned and chiral or anisotropic metasurfaces, each chiral or anisotropic metasurface having a respective chiral or anisotropic patterned portion;
    a series of spacer distances respectively defined between adjacent ones of the chiral or anisotropic metasurfaces; and
    at least one actuator structured for controllably applying force to individual ones of the chiral or anisotropic metasurfaces, controllably effecting movement of such individual chiral or anisotropic metasurfaces and change of respective ones of the spacer distances adjacent each moved chiral or anisotropic metasurface,
    whereby the Jones vector, for reflected and transmitted components of the light, is controllably modulated by chirality or anisotropy of the patterned portions combined with each change of spacer distance.

2. The optomechanical modulator of claim 1, wherein the at least one actuator is structured to apply force to a plurality of the chiral or anisotropic metasurfaces.

3. The optomechanical modulator of claim 1, further comprising a plurality of substrates, each formed in a unitary structure that includes a respective one of the chiral or anisotropic metasurfaces.

4. The optomechanical modulator of claim 3, wherein each unitary structure also includes a corresponding one of the spacer distances, whereby each substrate effects a non-chiral or non-anisotropic metasurface.

5. The optomechanical modulator of claim 1, wherein the at least one actuator is configured for independent control of movement of the individual chiral or anisotropic metasurfaces, effecting a multiplicity of controls for modulating a plurality of parameters of the electromagnetic radiation, including the polarization.

6. The optomechanical modulator of claim 5, wherein the multiplicity of controls are configured to implement a three-dimensional modulation of the polarization state of the electromagnetic radiation as represented by the Stokes vector on the full Poincaré sphere.

7. The optomechanical modulator of claim 5, wherein the multiplicity of controls are configured to adjust the independent control based on a plurality of roundtrip propagations of electromagnetic waves being induced in the series of spacer distances.

8. The optomechanical modulator of claim 7, further comprising a plurality of substrates, each formed in a unitary structure that includes a respective one of the chiral or anisotropic metasurfaces, wherein the multiplicity of controls are further configured to adjust the independent control based on a plurality of roundtrip propagations of electromagnetic waves being induced in the plurality of substrates.

9. The optomechanical modulator of claim 1, wherein force being applied by the at least one actuator has a mechanical driving frequency greater than or equal to 300 kilohertz.

10. The optomechanical modulator of claim 1, wherein the chiral or anisotropic patterned portion is an L-shaped hole array.

11. The optomechanical modulator of claim 1, wherein the at least one actuator includes at least one piezoelectric actuator.

12. A method of modulating amplitude, phase, and polarization of electromagnetic radiation using the optomechanical modulator of claim 1, the method comprising:
    directing the electromagnetic radiation into the chiral or anisotropic patterned portions of the series of metasurfaces; and
    actuating the at least one actuator to apply force to individual ones of the metasurfaces, thereby moving at least one of the metasurfaces and changing ones of the spacer distances adjacent each corresponding moved metasurface.

13. The method of claim 12, wherein the actuating includes applying force to a plurality of the individual metasurfaces, whereby a corresponding plurality of the spacer distances are independently changed.

14. The method of claim 13, further comprising controlling the actuating and the independent changing of the spacer distances adjacent moved ones of the metasurfaces to thereby implement three-dimensional modulation of the polarization state of the electromagnetic radiation as represented by the Stokes vector on the full Poincaré sphere.

15. The method of claim 14, wherein the controlling of the actuating includes adjusting the changing of spacer distance of each moved metasurface based on effects of a plurality of roundtrip propagations of electromagnetic waves being induced in the series of spacer distances.

16. The method of claim 15, wherein the controlling of the actuating is further based on effects of roundtrip propagations of electromagnetic waves being induced in a plurality of substrates each adjacent and aligned with respective ones of the parallel, aligned metasurfaces.

17. A method of modulating the Jones vector of electromagnetic radiation using the optomechanical modulator of claim 1, the method comprising:
    directing the electromagnetic radiation into the chiral or anisotropic patterned portions of the series of metasurfaces;
    actuating the at least one actuator to apply force to the metasurfaces, thereby moving at least one of the metasurfaces and changing a corresponding one of the spacer distances adjacent each moved metasurface; and
    controlling the actuating to thereby implement a three-dimensional modulation of the polarization state of the electromagnetic radiation as represented by the Stokes vector on the full Poincaré sphere.

18. The method of claim 17, wherein there is a number metasurfaces being moved, and wherein the controlling of the actuating includes using a number of controls to simultaneously and independently modulate a plurality of parameters of the electromagnetic radiation as described by the Jones vector, where the number of controls equals the number of moved spacer distances.

19. The method of claim 17, wherein the controlling of the actuating includes adjusting the change of spacer distance of each moved metasurface based on effects of a plurality of roundtrip propagations of electromagnetic waves being induced in the series of spacer distances.

20. The method of claim 17, wherein the controlling of the actuating is further based on effects of roundtrip propagations of electromagnetic waves being induced in a plurality of substrates each adjacent and aligned with ones of the parallel, aligned metasurfaces.

* * * * *